United States Patent
Enright

(10) Patent No.: US 10,402,300 B2
(45) Date of Patent: Sep. 3, 2019

(54) SYSTEM, CONTROLLER, METHOD, AND PROGRAM FOR EXECUTING SIMULATION JOBS

(71) Applicant: Fujitsu Limited, Kawasaki-shi, Kanagawa (JP)

(72) Inventor: Jim Enright, Slough (GB)

(73) Assignee: FUJITSU LIMITED, Kawasaki (JP)

( * ) Notice: Subject to any disclaimer, the term of this patent is extended or adjusted under 35 U.S.C. 154(b) by 262 days.

(21) Appl. No.: 15/609,772

(22) Filed: May 31, 2017

(65) Prior Publication Data

US 2018/0046561 A1 Feb. 15, 2018

(30) Foreign Application Priority Data

Jul. 8, 2016 (DE) .................. 10 2016 212 540
Jul. 8, 2016 (GB) .................. 1611947.1

(51) Int. Cl.
*G06F 9/48* (2006.01)
*G06F 11/34* (2006.01)
(Continued)

(52) U.S. Cl.
CPC ........ *G06F 11/3457* (2013.01); *G06F 9/4843* (2013.01); *G06F 9/4881* (2013.01);
(Continued)

(58) Field of Classification Search
CPC .................................................. G06F 9/4843
See application file for complete search history.

(56) References Cited

U.S. PATENT DOCUMENTS

| 6,092,049 | A | 7/2000 | Chislenko et al. |
| 7,640,224 | B2 | 12/2009 | Rish et al. |
| 2006/0107261 | A1 | 5/2006 | Vedula |

(Continued)

FOREIGN PATENT DOCUMENTS

| CN | 103412948 | 11/2013 |
| EP | 2 894 564 | 7/2015 |

(Continued)

OTHER PUBLICATIONS

Extended European Search Report dated Dec. 12, 2017 in corresponding European Patent Application No. 17180318.2, 11 pages.
(Continued)

*Primary Examiner* — Charlie Sun
(74) *Attorney, Agent, or Firm* — Staas & Halsey LLP

(57) ABSTRACT

A system for executing simulation jobs including: a job scheduler receiving a job request from a system user, the request specifying a simulation job and user-defined resource settings for the job; computing hardware resources executing simulation jobs designated by the scheduler which instructs the resources to execute the job with the settings; a performance monitor generates performance statistics; a statistics memory stores a characterization, the settings, and performance statistics for the job; an alert generator determines jobs similar to the specified job, to identify a first job having the same characterization as a second job, and for which the settings differ between the jobs, determining an improved performance statistic in one of the first and second jobs relative to the other, to generate an alert to the user indicating the resource settings of the job identified as having improved performance statistics.

15 Claims, 22 Drawing Sheets

(51) Int. Cl.
*G06F 9/50* (2006.01)
*G06F 11/30* (2006.01)

(52) U.S. Cl.
CPC .......... *G06F 9/5005* (2013.01); *G06F 9/5044* (2013.01); *G06F 11/3024* (2013.01); *G06F 11/3452* (2013.01)

(56) References Cited

U.S. PATENT DOCUMENTS

| | | |
|---|---|---|
| 2007/0239554 A1 | 10/2007 | Lin et al. |
| 2011/0022870 A1 | 1/2011 | McGrane et al. |
| 2012/0123764 A1 | 5/2012 | Ito et al. |
| 2015/0199218 A1* | 7/2015 | Wilson .................. G06F 9/5011 718/104 |
| 2017/0300359 A1* | 10/2017 | Kollur ................... G06F 9/5022 |

FOREIGN PATENT DOCUMENTS

| | | |
|---|---|---|
| GB | 2499292 | 8/2013 |
| WO | 2015/140021 | 9/2015 |

OTHER PUBLICATIONS

Tran Ngoc Minh et al., "Using Historical Data to Predict Application Runtimes on Backfilling Parallel Systems", 2010, IEEE Computer Society, p. 246-252.
Sameer S. Shende et al., "The TAU Parallel Performance System", The International Journal of High Performance Computing Applications, vol. 20, No. 2, Summer 2006, pp. 287-311.
Ventsislav Petkov, "Automatic Performance Engineering Workflows for High Performance Computing", 2013, 248 pages.
German Search Report dated Mar. 14, 2017 in German Patent Application No. 10 2016 212 540.0.
UK Search Report dated Dec. 21, 2016 in UK Patent Application No. GB1611947.1.
Open|SpeedShop, dated 2017, <https://openspeedshop.org/>.
Intel® VTune™ Amplifier 2017, retrieved from the internet on Jun. 1, 2017, <https://software.intel.com/en-us/intel-vtune-amplifier-xe>.
Allinea, retrieved from the internet on Jun. 2, 2017 <https://www.allinea.com/>.

* cited by examiner

| Setting | Performance Improvement |
|---|---|
| 1 - "Half # Process" | 1.74 |
| 2 - "Change Communication Library" | 1.38 |
| 3 - "Change File System for I/O" | 1.10 |

FIG. 21

Job E -Summary
Performance Summary
Execution Time = 70
Breakdown of Execution Time:
 -Calculation     = 3%
 -Communication   = 91%
 -I/O             = 6%
Recommendations
Below are recommendations on possible ways to improve the performance of your job.

*Recommendation 1)*
Overview:
    Half the number of processes used.
Description:
    A search of similar historical jobs to yours found that using fewer processes led to an improvement in performance.
Predicted Improvement:
    This change may give up to 74% improvement.
How to implement:
    In your job submit script, change the number of processes from 32 to 16.

*Recommendation 2)*
Overview:
    Change the communication library.
Description:
    A similar historical job used the Fujitsu MPI library to improvement performance.
Predicted Improvement:
    This change may give up to 38% improvement.
How to implement:
    In your submit script, change the application so that it is compiled with Fujitsu MPI.
    e.g. The command: "./simAppA_openMPI" becomes"./ simAppA_fujitsuMPI"

*Recommendation 3)*
Overview:
    Change file system used for I/O operations.
Description:
    A similar historical job performed I/O to the /parallel file systemd which resulted in a improvement in performance.
Predicted Improvement:
    This change may give up to 10% improvement.
How to implement:
    In your input file, change the file system used from /default to /parallel.

FIG. 22

SYSTEM, CONTROLLER, METHOD, AND PROGRAM FOR EXECUTING SIMULATION JOBS

CROSS-REFERENCE TO RELATED APPLICATIONS

This application claims the benefit of United Kingdom Application No. 1611947.1, filed Jul. 8, 2016, in the United Kingdom Intellectual Property Office, and German Application No. 102016212540.0, filed Jul. 8, 2016, in the German Intellectual Property Office, the disclosures of which are incorporated herein by reference.

BACKGROUND

1. Field

The embodiments lie in the field of job scheduling in shared computing resources. Specifically, the embodiments relate to the scheduling and execution of simulation jobs on computing hardware resources.

2. Description of the Related Art

There is an ever-increasing demand for the use of High Performance Computing (HPC) resources by non-expert users in order to speedup scientific simulations or to enable the solution of a problem too large or too complex to be solved on any other type of computing resource.

However, to maximize the use of these HPC resources an in-depth knowledge of the performance considerations and characteristics of such systems is required along with the knowledge about how to setup and run the scientific simulation itself.

This often proves the barrier to efficient execution of simulations for a non-expert HPC user.

Without knowledge of the HPC resource, such as its hardware characteristics, its software stack and performance considerations when using the parallel system a naïve usage of such systems may lead to poor performance of user applications.

As an example, take a simulation problem of size 64 rows×32 columns as shown in FIG. 1. If we assume that the application to solve this simulation problem can be run in parallel by splitting the calculation along the row dimension and distributing it to distinct processors. The processors then each work simultaneously to run the simulation to solve the problem in potentially faster time than possible when using just one process. In FIG. 2 for example, the simulation problem is split across 4 processes, with each process assigned 16 rows.

However, splitting the problem to run in parallel often incurs an overhead which limits the performance improvement as parallelization is increased. Such overheads include the need for communication between processes at regular intervals to coordinate and control the simulation or to gather information to a process for file output operations (I/O).

SUMMARY

Additional aspects and/or advantages will be set forth in part in the description which follows and, in part, will be apparent from the description, or may be learned by practice of the embodiments.

To illustrate the limit to performance improvement when running in parallel, FIG. 3 shows an execution timing diagram for the simulation problem when running on different process counts. For ease of illustration, simple timings have been assigned to each stage of the simulation—it is assumed that it takes a process 1 unit of time for calculation of the solution to one row of the simulation problem; that 2 units of time are required per process for inter-process communication (1 unit before calculation for distributing data and 1 unit after to gather data for I/O) and that 4 time units are required to perform I/O operations at the end of the simulation. From the figure it is possible to see how the overall execution time of the simulation changes with the number of processes used.

With 1 process, all 64 rows are computed by that single process and so calculation time is 64; there is no communication and I/O time is 4—thus overall execution time is 68 time units. With 2 processes, each process calculates for 32 rows simultaneously so the effective calculation time is 32; a total of 4 units are required for communication; and, again the I/O time is 4—for this the overall execution time is 40 time units a 1.7× improvement over 1 process. Similarly with 4 processes, where each process calculates for 16 rows each simultaneously a performance improvement of 2.4× over the 1 process execution is achieved. However, as the number of processes used increases further, communication starts to dominate execution time and performance worsens. At 16 processes, although the calculation time is just 4 time units (each process calculates for 4 rows simultaneously), the total communication time is 32—resulting in an overall execution time of 40 time units—the same performance as with 2 processes and worse than when 4 processes are used. Similarly at 32 processes the calculation time decreases to 2 time units but the total communication time is 64 resulting in a total execution time that is longer than the 1 process execution.

It is difficult to know the ideal choice for the number of processes without an investigation of performance. Moreover, it is likely that a user unfamiliar with HPC resources and such performance characteristics may run the simulation on as many processes as available to them, resulting in no apparent improvement in performance from the use of the HPC resource.

A common approach to finding the optimal configuration and performance of a parallel application on a HPC resource is to run a number of benchmarks of the application with different settings. This may include execution on a various process or thread counts; running with different communication libraries; performing I/O to different file systems or changing the configuration settings of the application to better suit the computer architecture on which it is executing.

This approach requires the user to have in-depth knowledge of both the application domain and the characteristics of the HPC resource. This makes it difficult for non-expert users to use such HPC resources effectively.

Embodiments include a system for executing simulation jobs, the system comprising: a job scheduler configured to receive a job request submitted by a system user, the job request specifying a simulation job and user-defined resource settings for the simulation job; computing hardware resources configured to execute simulation jobs as instructed by the job scheduler, the job scheduler being configured to instruct the computing hardware resources to execute the specified simulation job in accordance with the user-defined resource settings; a performance monitor configured to monitor execution of the specified simulation job by the computing hardware resources and to generate performance statistics representing the monitored execution; a performance statistics memory configured to store, for each of a plurality of executed simulation jobs, a characterization of the executed simulation job, the user-defined resource settings for the executed simulation job, and performance statistics representing the execution of the executed simulation job; an alert generator, the alert generator being configured to determine one or more executed simulation jobs that are similar to the specified simulation job, to identify, from among the determined one or more executed simulation jobs, a first executed simulation job for which the stored characterization is the same as the stored characterization of a second executed simulation job, and for which one or more of the user-defined resource settings differ between the first executed simulation job and the second executed simulation job, to determine a performance statistic that is improved in one of the first and second executed simulation job relative to the other, to generate an alert to the system user indicating the one or more user-defined resource settings of the first or second executed simulation job identified as having improved performance statistics.

Advantageously, embodiments raise an alarm to a system user that a performance improvement may be available by changing the user-defined resource settings. The alert generator is operable both during and after execution of the specified simulation job, depending on the implementation, and hence the system user is able to modify resource settings either during execution of the specified job, or if the simulation job is one in a series of simulation jobs, post-execution in order to improve execution of the forthcoming simulation jobs in the series.

Embodiments enable improved application efficiency and computing hardware resource utilization. The system outputs alerts to a user that highlight differences in resource settings that have realized comparably improved performance in historical simulation jobs. Implementing the differences in the resource settings as output by the alert generator ensures that the computing hardware resources are being used in the most optimal way for all users, regardless of their levels of experience. In other words, the system stores historical data in the performance statistics memory, which historical data compensates for a lack of system user experience in defining resource settings. In doing this, the system also provides an automated mechanism for monitoring the computing hardware resources for optimal usage.

By storing historical performance statistics and associated job characterization and job resource settings information in the performance statistics memory, alerts can be generated by the alert generator that give information to system users, who may be non-experts, so that they can run the current and/or future simulation jobs with the best configuration. A user who has little or no experience of running simulations similar to the simulation job being performed is able to benefit from stored knowledge of historical executions of similar jobs in deciding whether the user-defined resource settings could be adapted to improve performance. This is achieved without requiring any input from the system administration or performance optimization team.

The use of the performance statistics memory also increases performance transparency and enables improved information sharing of application performance and optimization techniques.

The user-defined resource settings determine computing hardware resource selection and utilization for the job scheduler in scheduling (i.e. instructing) the computing hardware resources for executing the simulation job. The user-defined resource settings may also be referred to simply as resource settings. The user-defined resource settings may have default values in the job scheduler, and hence may also be referred to as user-definable resource settings.

Executed simulation jobs determined as similar to the specified simulation job may be limited to those executed simulation jobs having the same user-defined resource settings as the specified simulation job. In such embodiments, the determination is of a performance statistic that is improved in the second executed simulation job relative to the first.

Each of the job scheduler, the performance monitor, and the alert generator, may be a processor (e.g. CPU) coupled to a memory. The memory storing processing instructions and processing inputs, outputs, and intermediate forms.

Optionally, a characterization of the specified simulation job may be obtained, and executed simulation jobs determined as similar to the specified simulation job may be limited to those executed simulation jobs having the same job characterization as the specified simulation job.

Optionally, the user-defined resource settings comprises a value for each of a plurality of individual settings; the specified simulation job and each of the executed simulation jobs comprises a simulating application running a simulation model in accordance with simulating application inputs; the stored characterization of the executed simulation job includes a value for each of a plurality of job characterization parameters representing the simulating application, the simulation model, and the simulating application inputs; and the alert generator is configured: to obtain a characterization of the specified simulation job by obtaining a value for each of the plurality of job characterization parameters for the specified simulation job, and to determine whether or not an executed simulation job is similar to the specified simulation job based on a comparison of the respective values of each of the plurality of job characterization parameters, and based on a comparison of the values of each of the respective individual settings.

Advantageously, such embodiments formalize the automated procedure for determining similar, and hence comparable, historically executed simulation jobs. Such formalization is efficient in terms of processing, and also ensures that alerts are raised when changed resource settings in relevant historical simulation jobs are ascertained.

A simulation model is an algorithm or series of linked algorithms and other processing instructions which convert inputs to simulation results. A simulating application may be tied to a particular simulation model, or it may be that a simulating application is generic and can run one of plural simulation models. It may be that the simulation model is itself an input to the simulating application.

The simulating application inputs may determine, for example, how many iterations of the simulation are performed, level of detail of particular aspects of the configuration, and domain-specific options. The simulating application inputs are internal to the application and instruct the simulating application how to run.

Furthermore, the alert generator may be configured to determine one or more one or more executed simulation jobs that are similar to the specified simulation job by comparing the value of each of the job characterization parameters and user-defined resource settings for the specified simulation job with the value of the same job characterization parameter or user-defined resource setting of each of the executed jobs, and if a predefined number or proportion of the values for the executed simulation job match the value for the specified simulation job for the same job characterization parameter or user-defined resource setting to within a predefined margin, to determine that the executed simulation job is similar to the specified simulation job.

Advantageously, such embodiments enable the notion of similarity to be tailored, for example at system design time, according to its implementation. There may be greater tolerance in some job characterization parameters than others in determining whether or not values that differ are matches or not. Furthermore, such embodiments provide a basis for quantifying the similarity between two simulation jobs.

Optionally, the user-defined resource settings include a number of parallel processes with which to run the simulation job, and a different number of parallel processes is included in the user-defined resource settings of the first and second executed simulation jobs; the performance statistics representing the execution of the first and second executed simulation job each include a time taken to execute the entire simulation job or a specified portion of the simulation job; the alert generator being configured to: determine a performance statistic that is improved in one of the first and second executed simulation job relative to the other based on a comparison of the respective times taken to execute; and to indicate the number of parallel processes of the executed simulation job from among the first and second executed simulation job having the lesser time taken to execute in the alert.

Such embodiments enable performance statistics about historical executions of similar simulation jobs to be leveraged to determine whether an improvement can be made in the number of processes across which the execution of the specified simulation job is parallelized. Furthermore, if such an improvement can be made, the system user is alerted, so that a change can be implemented either part-way through the execution of the specified simulation job, or prior to the execution of the next similar simulation job by the user, noting that simulation jobs are often one of a series of such jobs.

For example, the performance statistic that is compared is time to execute, in other words the time expired from start to finish of execution of the simulation job.

Optionally, the user-defined resource settings further include a number of threads per parallel process, and a different number of threads per parallel process is included in the user-defined resource settings of the first and second executed simulation jobs; and the alert generator is configured to indicate in the alert the number of parallel processes and the number of threads per process of the execution simulation job from among the first and second executed simulation job having the lesser time taken to execute.

Such embodiments enable performance statistics about historical executions of similar simulation jobs to be leveraged to determine whether an improvement can be made in the number of threads per process across which the execution of the specified simulation job is parallelized. Furthermore, if such an improvement can be made, the system user is alerted, so that a change can be implemented either part-way through the execution of the specified simulation job, or prior to the execution of the next similar simulation job by the user, noting that simulation jobs are often one of a series of such jobs.

Optionally, the user-defined resource settings include a selection of a file system for I/O operations arising in the simulation job, and a different file system for I/O operations is selected in the user-defined resource settings of the first and second executed simulation jobs;

the performance statistics representing the monitored execution and the performance statistics representing the execution of the executed simulation job each include a time taken to complete I/O operations arising in the entire simulation job or a specified portion of the simulation job; the alert generator being configured to: identify an executed simulation job from the first and second executed simulation jobs having improved performance statistics compared to the other based on a comparison of the respective times taken to complete I/O operations; and indicate in the alert the file system for I/O operations of the executed simulation job from the first and second executed simulation jobs having the lesser time taken to complete I/O operations.

Such embodiments enable performance statistics about historical executions of similar simulation jobs to be leveraged to determine whether an improvement can be made in the file system being used for I/O operations in the specified simulation job. Furthermore, if such an improvement can be made, the system user is alerted, so that a change can be implemented either part-way through the execution of the specified simulation job, or prior to the execution of the next similar simulation job by the user, noting that simulation jobs are often one of a series of such jobs.

Optionally, each performance statistic is a value of a performance variable indicating a standard of performance of an aspect of the execution of the simulation job; the alert generator is configured to identify a plurality of candidate alerts by identifying, for each of the executed simulation jobs determined to be similar to the specified simulation job, as the first executed simulation job, whether there are any executed simulation jobs for which the stored characterization as the stored characterization for the determined similar executed simulation job, and if so, to ascertain, as the second executed simulation job, which of the executed simulation jobs having the same stored characterization has the value indicating the best standard of performance for the or each performance variable, to map the performance variable to one or more resource settings influencing the performance variable using a predefined mapping, and, if the value of the mapped one or more resource settings differ between the ascertained second executed simulation job and the specified simulation job, to store the performance variable, the mapped one or more resource settings of the ascertained second executed simulation job, and the difference in resource settings as a candidate alert; and the alert generator is further configured to generate an alert to the system user by selecting an alert from the stored candidate alerts.

Each performance statistic is a value of a performance variable indicating a standard of performance of an aspect of the execution of the simulation job. The notion of improved will be predefined in the alert generator, so that for each performance variable, it is predefined whether an improved standard of performance is indicated by a relatively greater or relatively lesser value. It may be that there are performance variables for which the mapping of value to standard of performance is more complex, and that a mapping or formula for establishing the standard of performance represented by a value is predefined and stored by the alert generator.

Furthermore, the alert generator may be configured to quantify, as a performance improvement quantity, the difference in standard of performance for the performance variable between the first executed simulation job and the ascertained second executed simulation job, and to rank the candidate alerts in order of performance improvement quantity, and to generate an alert by notifying the system user of each of the top n ranked candidate alerts.

Advantageously, such embodiments provide a mechanism for prioritizing alerts, when many candidate alerts exist. As the number of simulations performed increases, so does the number of different simulations for which performance statistics and resource settings are available in the performance statistics memory for comparison with the specified simulation job. As such, the number of candidate alerts may increase. It is important that the system user is provided with potential resource settings that are more likely to have a more significant impact on performance, and hence the ranking system as defined above is implemented.

In some embodiments the alert generator is configured to quantify a level of similarity between the specified simulation job and each of the one or more executed simulation jobs that are determined to be similar to the specified simulation job, based on a number of job characterization parameters and user-defined resource settings for which the value of the respective executed simulation job matches the value for the specified simulation job to within the predefined margin; and the alert generator is further configured to attribute a weighting to the candidate alerts based on the quantified level of similarity between the specified simulation job and the executed simulation job for which the resource settings and performance improvement quantity are stored rank the candidate alerts, and to rank the candidate alerts in order of performance improvement quantity weighted by the attributed weighting, and to generate an alert by notifying the system user of each of the top n ranked candidate alerts.

As a further development of the ranking, the ability to quantify the similarity effectively provides a measure of correlation between the specified simulation and the executed simulation for which the relatively improved performance statistics are recorded in the performance statistics memory. This measure of correlation moderates the performance improvement, so that likelihood of applicability or relevance to the specified simulation job as well as potential extent of performance improvement is taken into account in the ranking process.

Optionally, the alert generator is configured to transmit the generated alert to the job scheduler, and the job scheduler is configured to set the different user-defined resource setting identified in the alert as a default for the next simulation job submitted by the system user.

Each user-defined resource setting is a set value of a variable. For example, the variable might be which communication library to use for inter-process communication and the value the selection from one of plural such libraries. The variable might be how many processors to use, with the value being the selected value. The variable might be which processors to use, with the value identifying a selected one or plurality of processors. The variable might be which file system to use for I/O operations, with the value identifying a selected one from a plurality of available file systems.

It may be a system-user-configurable option, to determine whether or not to allow default settings, and for which settings to allow the system to set defaults, and whether or not the defaults are allowed to supersede resource-settings previously defined by the user. Taking into account that simulation jobs often take place as one of a series of simulation jobs, the system of automatically implementing differences as defaults provides a mechanism to realize performance improvements for the next execution by the system user.

It may be that the executed simulation jobs for which performance statistics and user-defined resource settings are stored by the performance statistics memory are simulation jobs executed by the system.

Optionally, the performance statistics memory is configured to store, upon completion of the specified simulation job, for the specified simulation job as an executed simulation job, a characterization of the specified simulation job, the user-defined resource settings for the specified simulation job, and the performance statistics generated by the performance monitor representing the execution of the specified simulation job.

Advantageously, the specified simulation job extends the performance statistics stored in the performance statistics memory and therefore improves the ability of the system to generate alerts for future simulation jobs.

Furthermore, if the system determines that the characterization of the specified simulation job is the same as the characterization of an executed simulation job in the performance statistics memory, and the user-defined resource settings are the same for the specified simulation job and the executed simulation job, then the system may be configured to aggregate the performance statistics to generate an average value for each performance variable, and stores the average value as the performance statistic for comparison with other executed simulation jobs by the alert generator.

The functionality attributed to the system may be carried out by any of a number of components. As an example, it may be that the performance statistics memory has a controller function for carrying out said functionality. As an alternative, said functionality may be carried out by the performance monitor.

Furthermore, if the system determines that the characterization of the specified simulation job is the same as the characterization of an executed simulation job in the performance statistics memory, and the user-defined resource settings are different for the specified simulation job and the executed simulation job, then the system links the performance statistics of the specified simulation job and the executed simulation job.

If a new execution has the same job characterization as a historical executed job but different user-defined resource settings-for example the job utilizes a different number of processes or performs I/O to a different file system-then the new performance statistics and job information is linked to the performance statistics and job information for the historical executed job, but because they were generated with different settings, the performance statistics are not aggregated. By creating these links, it is possible to build a picture of how application performance is affected by changing job submission settings. This is shown in FIG. 11 where performance information for the same simulation problem executed on a range of different process counts is combined.

BRIEF DESCRIPTION OF THE DRAWINGS

A detailed description of embodiments will now be provided, with reference to the accompanying drawings in which:

FIG. 21 illustrates candidate alerts in the worked example;

FIG. 22 illustrates alerts in a text format in the worked example;

DETAILED DESCRIPTION

Figure 1:
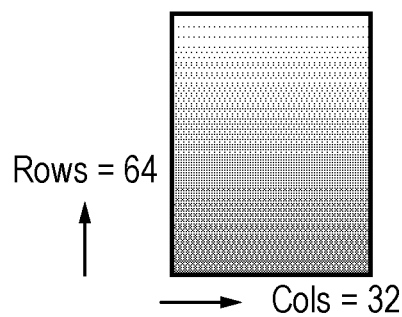
FIG. 1 is a visual representation of a simulation job.
Figure 2:
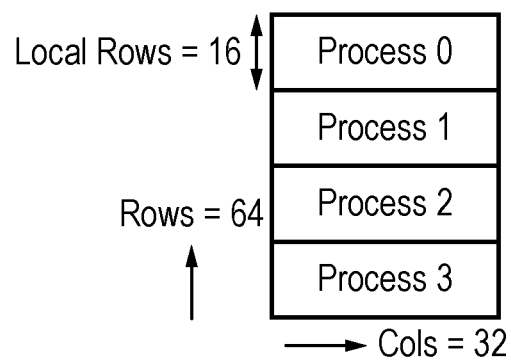
FIG. 2 is a visual representation of a simulation job divided among multiple processes.
Figure 3:
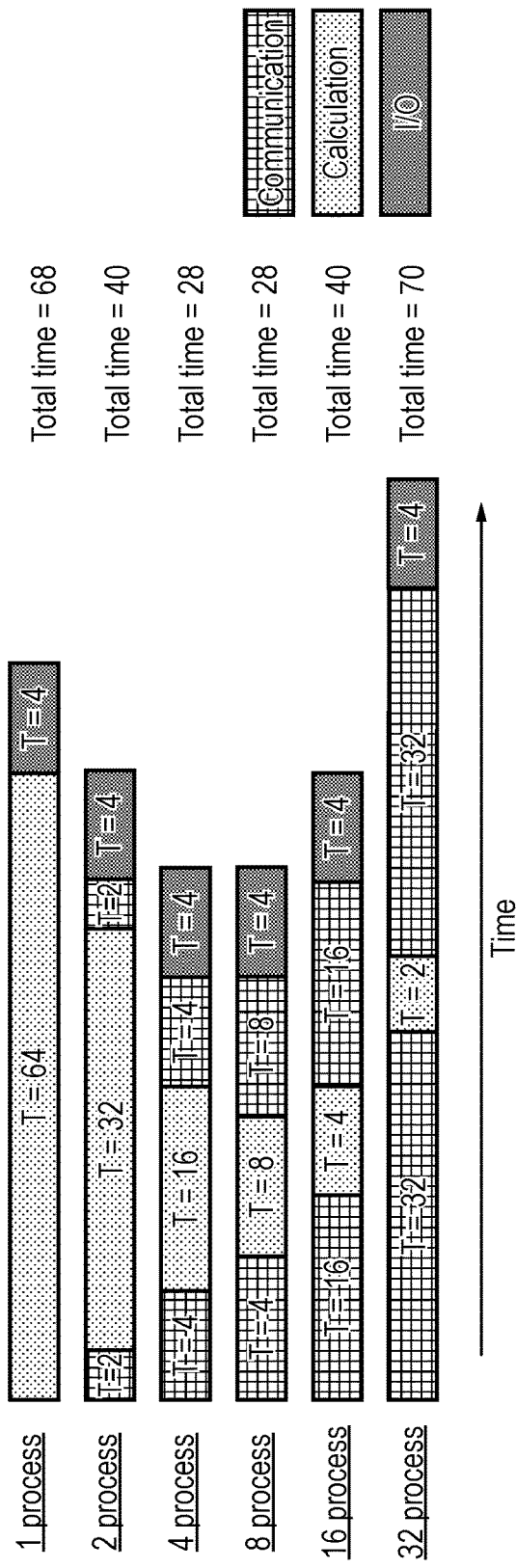
FIG. 3 executes simulation timings for the simulation job executed with different numbers of processes.

Reference will now be made in detail to the embodiments, examples of which are illustrated in the accompanying drawings, wherein like reference numerals refer to the like elements throughout. The embodiments are described below by referring to the figures.

Figure 4:
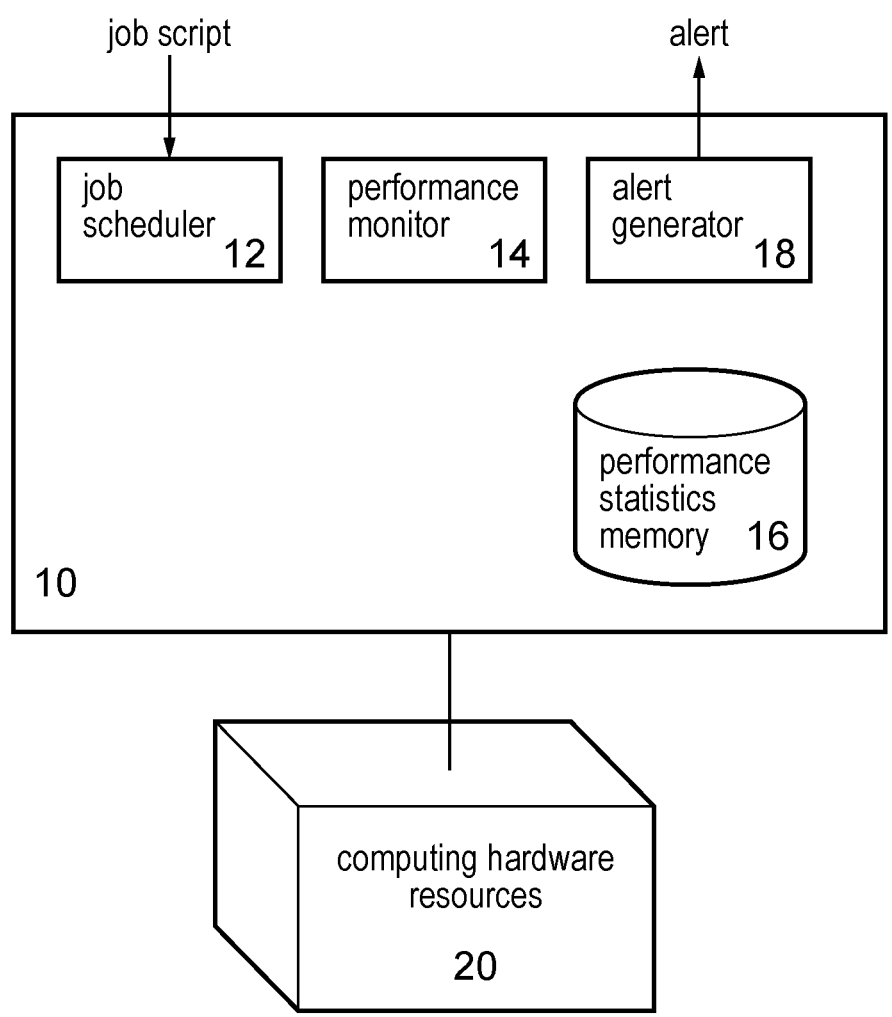
FIG. 4 is a schematic illustration of an embodiment.

The system of FIG. 4 is a system of computing hardware resources 20 and a controller 10 or management system for those computing hardware resources. The computing hardware resources 20 are adapted to execute simulation jobs, and may be HPC (High Performance Computing) resources. The computing hardware resources 20 include memory, both volatile (non-persistent) and non-volatile (persistent/storage), processors, and data I/O apparatus hardware components. The computing hardware resources 20 are interconnected, and have access to software including simulating applications, with which to execute simulations. The computing hardware resources 20 act under the instruction of the job scheduler 12, which determines which resources execute which simulation job and when. The computing hardware resources may be, for example, cloud computing infrastructure, for example, infrastructure-as-a-service.

The job scheduler 12 receives a job request from a system user. The alert generator 18 outputs an alert to the system user. The job scheduler 12 and performance monitor 14 in particular interact directly with the computing hardware resources 20, although direct interaction between the alert generator 18 or the performance statistics memory 16 and the computing hardware resources 20 may also occur.

A simulation job is specified (i.e. requested) by a job request, which is a set of commands submitted to the job scheduler 12 by a system user, which job scheduler 12 may also be an HPC workload manager or batch scheduler. The simulation job may consist of one or more applications which perform the different phases of the workflow such pre-processing, running the main simulation and post-processing.

A simulation job comprises a simulating application, executed by computing hardware resource and running a simulation model in accordance with simulating application inputs. The simulating application inputs may determine, for example, how many iterations of the simulation are performed, level of detail of particular aspects of the configuration, and domain-specific options. The simulating application inputs are internal to the application and instruct the simulating application how to run. They are distinct from the user-defined resource settings, which determine computing hardware resource selection and utilization for the job scheduler 12 in scheduling (i.e. instructing) the computing hardware resources 20 for executing the simulation job. A job request specifies a simulation job, which specification details at least a simulating application, a simulation model (unless the model is default in the simulating application), and user-defined resource settings, for example, number of processes, number of threads per process, inter-process communication library, file system for I/O operations. The job request may also specify simulating application inputs to instruct the application how to run.

A process is an execution of a computer program or application. It includes the program code and associated heap and stack memory and execution state for the instance of the computer program. One way of parallel execution on a system of computing hardware resources 20 is by running multiple processes which carry out similar instructions (i.e. run the same model) on different pieces of data. Coordination between processes is achieved by using an inter-process communication library such as MPI (Message Passing Interface).

Processes may contain multiple independent 'strands' called threads which are another source of parallelism on the system. As threads are part of one process they can therefore share the process' heap data to allow collaboration on the same data. Threads can also have private data, by means of their own stack, to allow independent execution when required.

The job scheduler 12 is configured to receive job requests (which may be, or include, job scripts) from system users. For example, it may be that the job scheduler 12 provides an interface accessible by system users for formulation of job requests, or that system users transmit job requests to an address, or store job requests at a particular physical address, and in that way jobs are received by the job scheduler 12. The job scheduler 12 parses the job request to extract relevant information.

The precise functioning of the job scheduler 12 is implementation specific. The job scheduler 12 maintains a queue of simulation jobs, and having determined based on the job request the computing hardware resources 20 that are required for each simulation job, the job scheduler 12 instructs the computing hardware resources 20 to execute a job from the queue when the required computing hardware resources 20 become available. For example, it may be that the queue is operated on a first-in-first-out basis, or some other system of prioritization may be in operation.

The performance monitor 14 is configured to monitor execution of the specified simulation job by the computing hardware resources 20 and to generate performance statistics representing the monitored execution. For example, the performance monitor 14 may time execution of different stages within the job, such as communication time, calculation time, and I/O time. The performance monitor 14 may use profiling and tracing tools to gather performance statistics.

Profiling tools perform application performance analysis by collecting summary statistics of performance (performance statistics) during execution of the simulation job. The performance statistics generated may include one or more of: the times in routines, counts of routines, invocations of inter-process communications, and call-tree of functions called in the application.

Tracing tools perform application performance analysis by recording the chronology of when and where execution events occurred. The performance statistics generated may include when a function or loop is entered and exited or when a communication message is sent or received.

Both the alert generator 18 and the job scheduler 12 are functions that may be performed by a workload manager apparatus or a system controller, that is, a computing device performing a control or managing function with respect to the computing hardware resources 20 of the system. The computing device may comprise a processor, memory, network connectivity, input mechanisms (either direct via mouse keyboard, and/or via a network or internet connection), output mechanisms (either direct via a display and/or via a network or internet connection).

The alert generator 18 is configured to determine one or more executed simulation jobs that are similar to the specified simulation job. The executed simulation jobs may also be referred to as historical executed simulation jobs, since they are simulation jobs for which the execution occurred in the past. The performance statistics memory 16 stores, for each of the plurality of executed simulation jobs, a characterization of the executed simulation job, the user-defined resource settings for the executed simulation job, and performance statistics representing the execution of the executed simulation job.

The determination of similarity may be based solely on user-defined resource settings, or may be constrained to two simulation jobs being determined to be similar only if the user-defined resource settings match, or are deemed similar, and also based on a characterization of the simulation job. The user-defined resource settings may comprise a value for each of a plurality of individual settings, so that similarity is determined by comparing the respective value of each individual setting for the specified simulation job and an executed simulation job.

It may be that characterisations are used to describe the specified simulation jobs and the historical executed simulation jobs. The characterizations form the basis of the similarity determination. For example, the stored characterization of the executed simulation job includes a value for each of a plurality of parameters representing the simulating application, the simulation model, and the simulating application inputs. The plurality of parameters may include a value identifying the simulating application, and optionally the build number, a value identifying the simulation model employed, and one or more values each representing particular simulating application inputs. The alert generator 18 is configured to obtain a comparable characterization of the specified simulation job, i.e. the simulation job being monitored, in order to form a basis of comparison and hence similarity determinations. The alert generator 18 may find one or more simulation jobs that are similar to the specified simulation job by comparing the characterization of each of the plurality of executed simulation jobs for which a characterization is stored in the performance statistics memory 16 with the obtained characterization, on a value-by-value basis. If a predefined number or proportion of the values for the executed simulation job match the value for the specified simulation job for the same job characterization parameter to within a predefined margin, the alert generator 18 determines that the executed simulation job is similar to the specified simulation job. The predefined margin may be different for each parameter.

The alert generator 18 may quantify the similarity between two jobs, based on the number of values (either just the user-defined resource setting values, or both the user-defined resource setting values and the characterization values) that match (to within the predefined margin for that parameter), and optionally also based on the closeness of the match. The similarity quantity may be used firstly for comparison with a similarity threshold, wherein a similarity quantity in excess of the threshold results in a determination of similarity, and optionally secondly in ranking candidate alerts for determining which information to output to the system user.

The alert generator 18 is also configured to identify a first executed simulation job for which the stored characterization is the same as the stored characterization of a second executed simulation job, and for which the user-defined resource settings differ between the first executed simulation job and the second executed simulation job, and to determine a performance statistic that is improved in one of the first and second executed simulation job relative to the other. The particular performance statistics that are compared will depend on the implementation, since performance statistics can be gathered at varying levels of detail and in respect of different aspects of simulation. The system may be configurable in this regard.

Each performance statistic is a value of a performance variable indicating a standard of performance of an aspect of the execution of the simulation job. The notion of improved will be predefined in the alert generator 18, so that for each performance variable, it is predefined whether an improved standard of performance is indicated by a relatively greater or relatively lesser value. It may be that there are performance variables for which the mapping of value to standard of performance is more complex, and that a mapping or formula for establishing the standard of performance represented by a value is predefined and stored by the alert generator 18.

The alert generator 18 is also configured to identify a difference between the resource settings of the first executed simulation job and the resource settings of the second executed simulation job. The alert generator 18 is configured to compare the resource settings of the specified simulation job with the stored resource settings of the executed simulation jobs determined to have improved performance statistics. It may be that a mapping is stored which associates the performance variable of the improved performance statistic with one or more resource settings influencing the performance variable. Identifying a difference in resource settings comprises comparing the resource settings mapped to the performance variable of the improved performance statistic in the two sets of resource settings, and recognizing a difference when one exists.

The alert generator 18 is configured to generate an alert to the system user indicating the one or more user-defined resource settings of the first or second executed simulation job identified as having improved (i.e. relatively better) performance statistics. The alert may be a frame on a display of a user terminal, detailing information. Alternatively, the alert may also comprise a noise or some other form of output. The alert may be an email or message sent to the system user in some other way. The alert indicates the ascertained difference in resource settings. The indication of the difference may simply be notifying the system user of the pertinent (i.e. ascertained as being different) user-defined runtime setting of the executed simulation job. Additionally, the pertinent user-defined runtime setting of the specified simulation job may be included in the alert. Additionally, the improvement in standard of performance between the first and second executed simulation jobs, which may be expressed as a percentage, depending on the performance variable, may be indicated in the alert.

Figure 5:
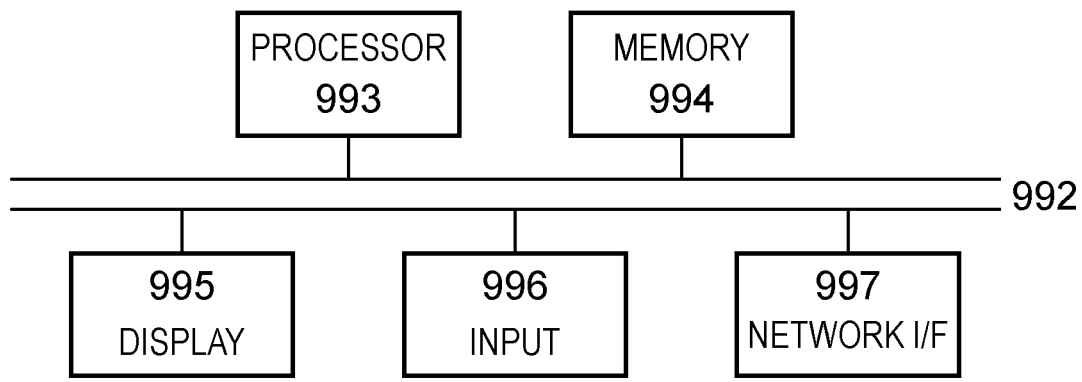
FIG. 5 illustrates a hardware configuration of an embodiment.

FIG. 5 is a block diagram of a computing device, such as a system controller, HPC workload manager, or computing hardware resource manager, is an embodiment or is included in an embodiment, and which may be used to implement a method of an embodiment. The computing device comprises a processor 993, and memory, 994. Optionally, the computing device also includes a network interface 997 for communication with other computing devices, for example with other computing devices of the embodiments.

For example, an embodiment may be composed of a network of such computing devices operating cooperatively. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the job scheduler, performance monitor, performance statistics memory, alert generator, and other components described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The job scheduler 12 of FIG. 4 may be a processor 993 (or plurality thereof) executing processing instructions (a program) stored on a memory 994 and exchanging data (i.e. receiving a job request) with a system user (i.e. a user terminal) via a network I/F 997. In particular, the processor 993 executes processing instructions to receive, via the network I/F, a job request from a system user, for example, at a user terminal connected to the system via the internet or some other network connection, and to transform the received job request into instructions for the computing hardware resources. Furthermore, the processor 993 may execute processing instructions to store the job request, or information extracted therefrom, on a connected storage unit and/or to transmit, via the network I/F 997, instructions to the computing hardware resources 20 for executing the simulation job requested by the received job request.

The performance monitor 14 of FIG. 4 may be a processor 993 (or plurality thereof) executing processing instructions (a program) stored on a memory 994 and exchanging data via a network I/F 997. In particular, the processor 993 executes processing instructions to receive, via the network I/F, information representing the execution of the simulation job from the computing hardware resources and generate performance statistics from the received information. The processor 993 may directly monitor the computing hardware resources via the network I/F. Furthermore, the processor 993 may execute processing instructions to store performance statistics on a connected storage unit and/or to transmit generated performance statistics to the performance statistics memory 16 for storage, and to the alert generator for comparison with performance statistics of similar executed simulation jobs.

The performance statistics memory 16 of FIG. 4 may be a memory 994 storing data and exchanging data via a network I/F 997. In particular, the memory 994 receives performance statistics from the performance monitor 14, a characterization of the specified simulation job from the job scheduler 12, and user-defined resource settings for the specified simulation job from the job scheduler 12 for storage. The performance statistics generator 16 may also include a processor 993, configured to receive queries from the alert generator 18 for information relating to simulation jobs similar to the specified simulation job, and to respond to the query with performance statistics, characterization of the simulation job, and user-defined resource settings, for simulation jobs similar to the specified simulation job. Furthermore, the processor 993 may execute processing instructions to transmit query results to the alert generator 18 for processing.

The alert generator 18 of FIG. 4 may be a processor 993 (or plurality thereof) executing processing instructions (a program) stored on a memory 994 and exchanging data via a network I/F 997. In particular, the processor 993 executes processing instructions to receive information about the specified simulation job from the job scheduler and to use the information to determine one or more executed simulation jobs that are similar to the specified simulation job. The processor 993 also executes processing instructions to receive performance statistics and user-defined resource settings about the determined similar executed simulation jobs and executed simulation jobs having matching job characterizations to the determined similar executed simulation jobs, for comparison with one another, to identify, from among the determined one or more executed simulation jobs, a first executed simulation job for which the stored characterization is the same as the stored characterization of a second executed simulation job, and for which one or more of the user-defined resource settings differ between the first executed simulation job and the second executed simulation job, to determine a performance statistic that is improved in one of the first and second executed simulation job relative to the other. The processor also executes processing instructions to generate the alert to the system user indicating the ascertained difference in the user-defined resource settings. Furthermore, the processor 993 may execute processing instructions to transmit, via the network I/F 997, the generated alert to the system user.

Methods of the embodiments may be carried out on a computing device such as that illustrated in FIG. 5. Such a computing device need not have every component illustrated in FIG. 5, and may be composed of a subset of those components. A method embodiment may be carried out by a single computing device in communication with one or more data storage servers via a network. The computing device may be a data storage itself storing the generated alert and/or the performance statistics.

A method embodiment may be carried out by a plurality of computing devices operating in cooperation with one another. One or more of the plurality of computing devices may be a data storage server storing at least a portion of the generated alert.

Figure 6:
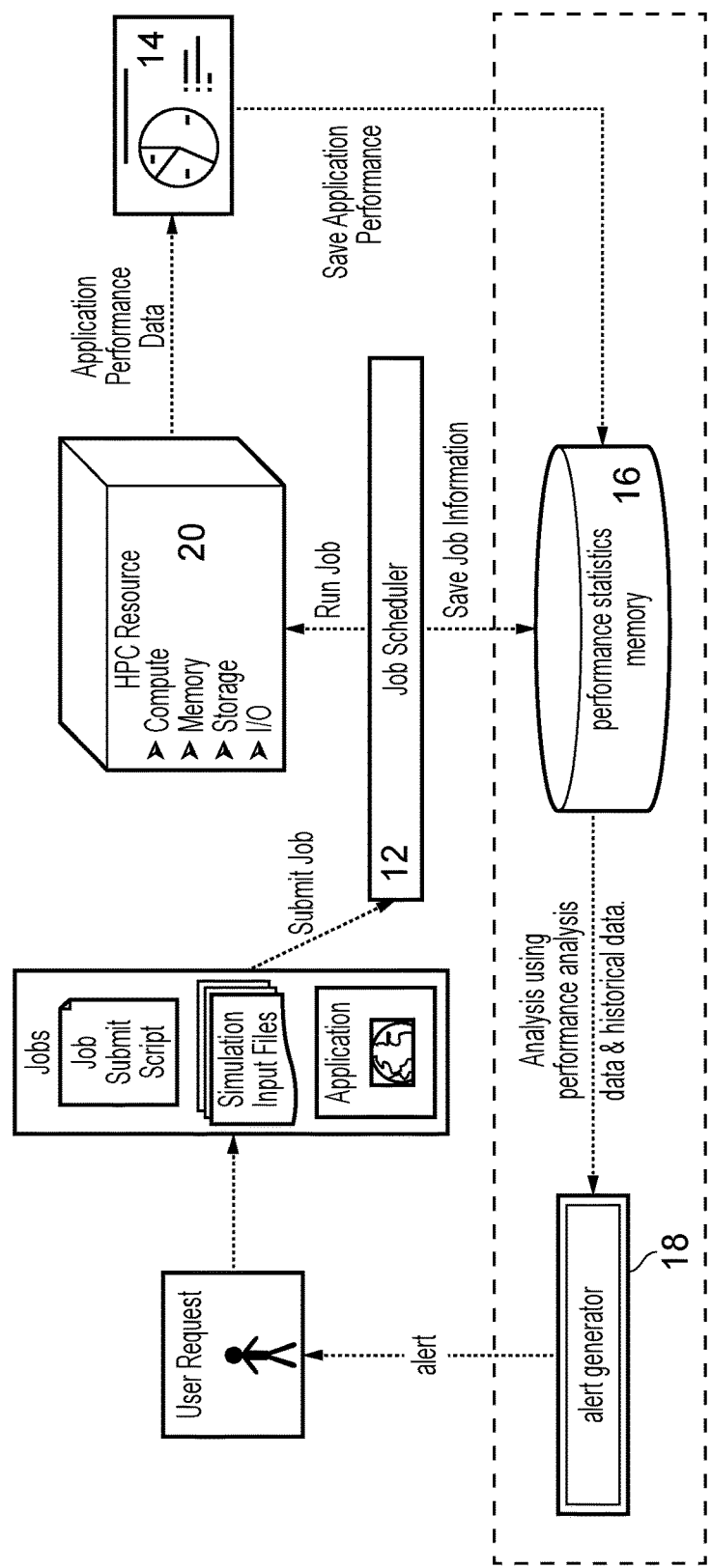
FIG. 6 illustrates a flow of information in an embodiment.

FIG. 6 illustrates a flow of information in an embodiment. The user submits a simulation job to the job scheduler 12. The simulation job is specified by a job submit script, and includes simulation input files running on a simulating application. The job scheduler instructs the HPC resource (exemplary of computing hardware resources) to execute the simulation job. The execution, that is, the running of the simulating application by the HPC resources, is monitored by the performance monitor, which obtains application performance data from the HPC resource. This application performance data, which is exemplary of performance statistics, is saved to a performance statistics memory 16, along with the job information (including a characterization of the specified simulation job and the user-defined resource settings) and optionally any other pertinent information, such as system messages or log files. This creates a holistic picture of performance for the job.

The performance of the job is then analyzed by the alert generator 18 and compared to that of other similar jobs to identify changes in the user-defined resource settings that could improve performance, for example, the next time a similar simulation job is requested by the user. Once similar jobs are found, these are checked to find executed simulation jobs characterized in the same way but with different user-defined resource settings, to see whether the performance statistics for the jobs characterized in the same way indicate a better standard of performance can be achieved by changing user-defined resource settings. This becomes an alert to the user that a better standard of performance is obtainable by revising the user-defined resource settings.

Figure 7:
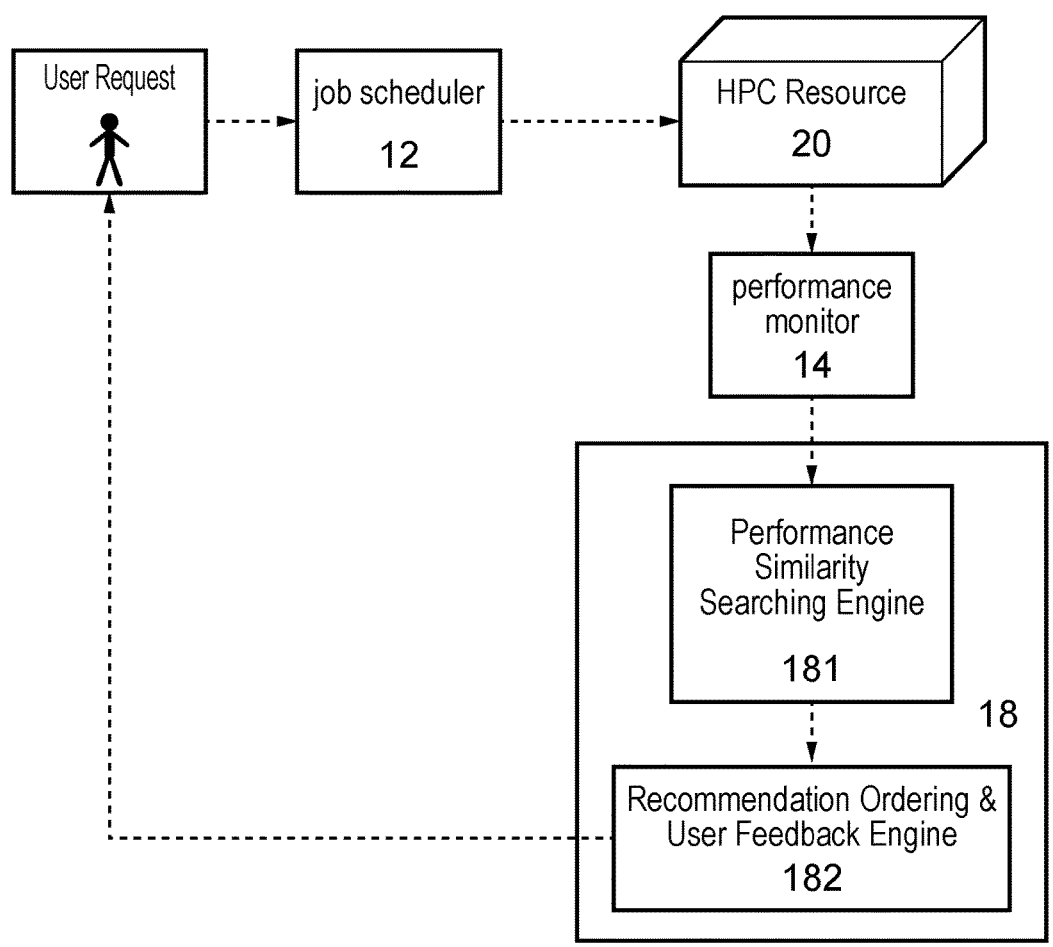
FIG. 7 illustrates a feedback loop in an embodiment.

FIG. 7 illustrates a feedback loop of an embodiment. The user request submits a job request to the job scheduler 12. The job scheduler 12 may be a job monitoring and scheduling engine. The job scheduler 12 submits the simulation job specified by the job request to the HPC resource 20 for execution. The performance monitor 14, which may be a performance monitoring engine 14, gathers data about the execution and generates performance statistics. The functionality of the alert generator 18 is divided into a performance similarity searching engine 181, which queries the performance statistics memory 16 for performance statistics and other job information relating to jobs similar to the specified simulation job, and for executed simulation jobs having matching job characterizations with the determined similar executed similar jobs, and a recommendation ordering and user feedback engine, which analyses the performance statistics and other job information, generates alerts (recommendations), and outputs them to the user. The user can then implement the revised user-defined resource settings either during execution of the specified simulation job, or in a forthcoming similar simulation job.

The functionality at each stage will be discussed in more detail below.

Figure 8:
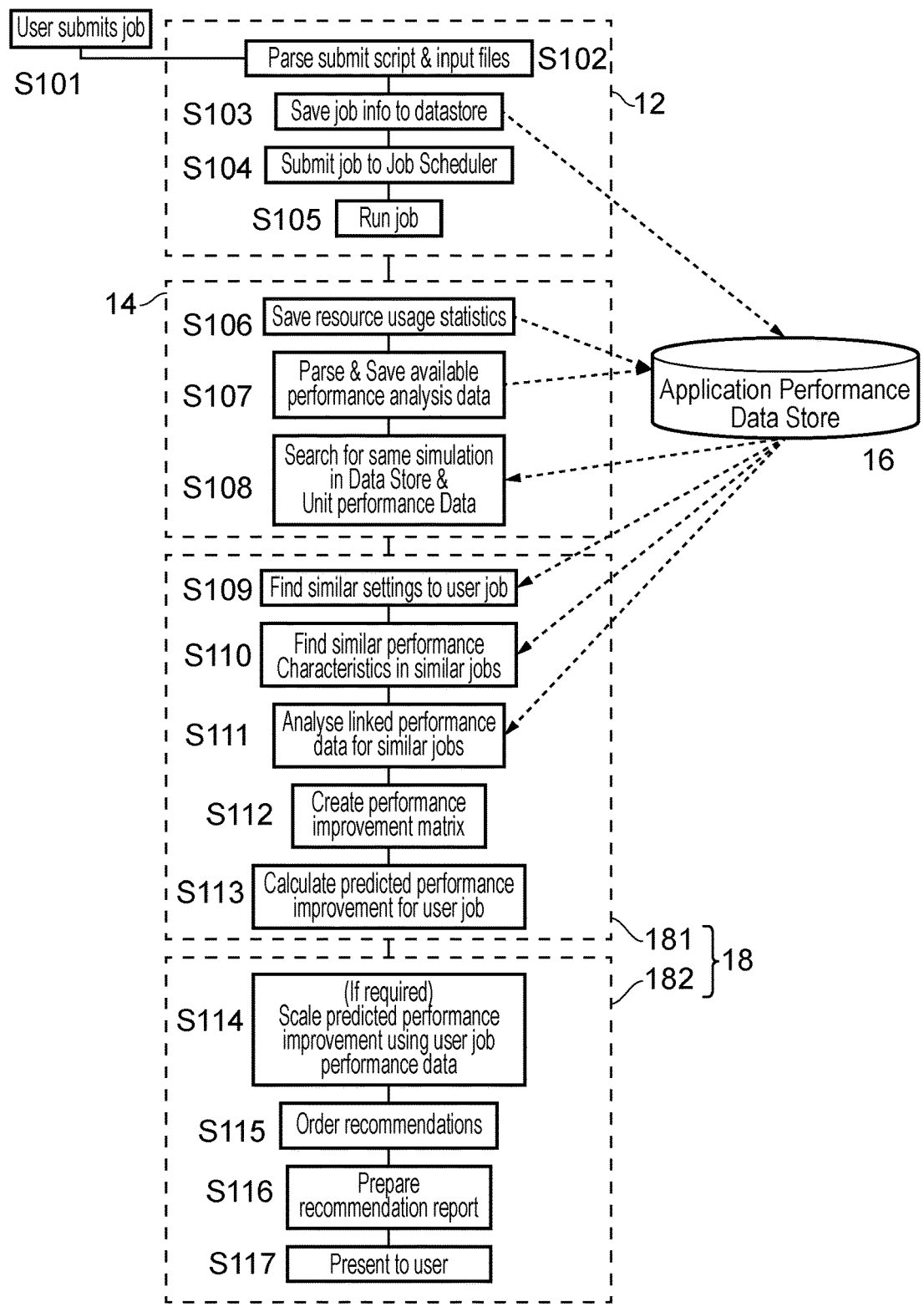
FIG. 8 is a flowchart illustrating a flow of operations in an embodiment.

FIG. 8 is a flowchart illustrating a flow of operations in an embodiment.

Steps S101 to S105 are exemplary of the functionality of the job scheduler 12.

At step S101 a simulation job request is received by the job scheduler 12 from a system user. When a user submits a simulation job request to run an application on a HPC resource, the job submit script and any input and data files are parsed and analyzed at step S102. At step S103, pertinent information to characterize the simulation job, and to record the user-defined resource settings, submitted by a user is saved to the application performance data store 16 (also referred to as a performance statistics memory 16). In this way a signature can be created for each job. By having this information and the signature it is possible to identify and link jobs for the simulation jobs characterized in the same way.

Figure 9:
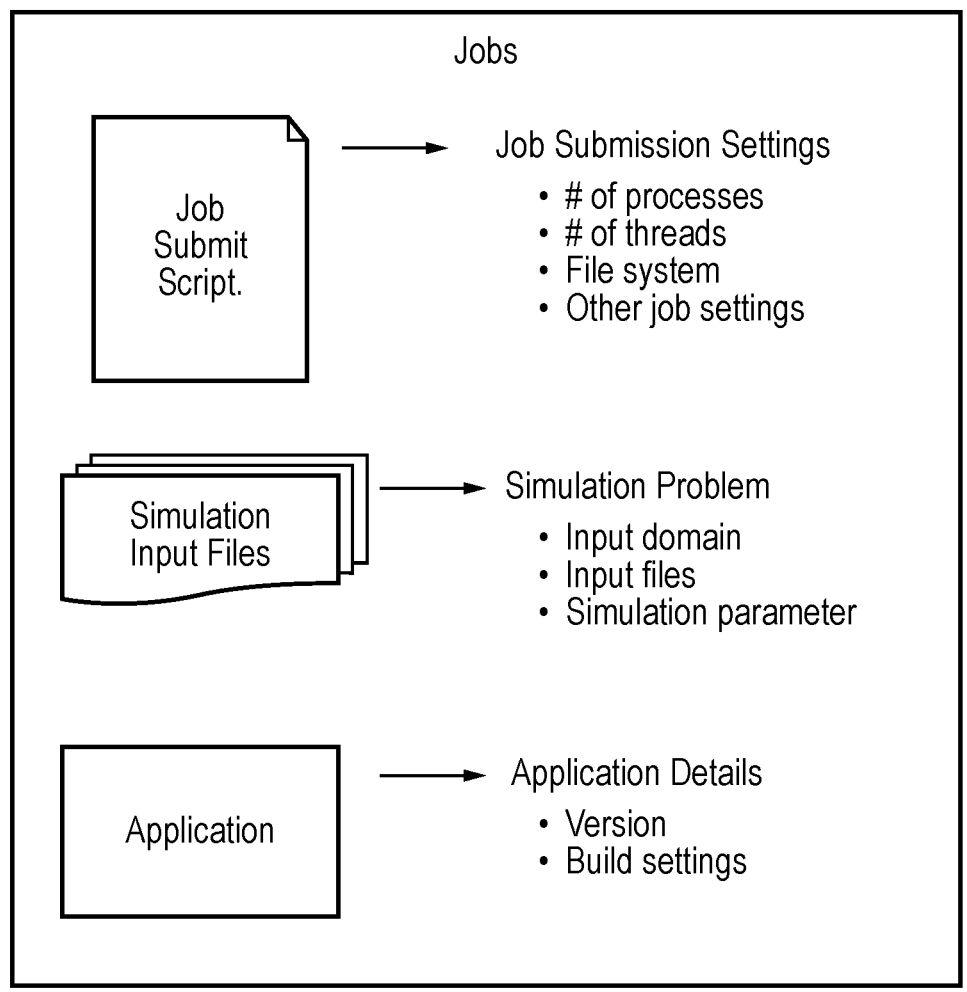
FIG. 9 illustrates exemplary job information.

FIG. 9 shows the type of information that is stored from each job request in order to identify the characteristics of the simulation job. This includes the characterization of the simulation job, which includes, for example, copies of the input and data files for the simulation and details about the application used to run the simulation. The stored information also includes the user-defined resource settings (which may be referred to as job submission settings), which includes, for example, number of processes and threads used; the file system used for I/O operations; and other job settings.

At step S104, the simulation job is queued for scheduling, (which may be an HPC workload batch scheduler) and at step S105 the simulation job is run as usual when the required hardware resources become available.

Steps S106 to S108 are exemplary of the functionality of the performance monitor 14.

The performance of each simulation job is monitored and analyzed. This can occur both during the execution, where regular performance snapshots are taken, and at the conclusion of job execution when a full picture of application performance is available. This information about performance (performance statistics) is translated into performance statistics and stored in the application performance data store 16 in association with the other job information stored in step S103.

Figure 10:
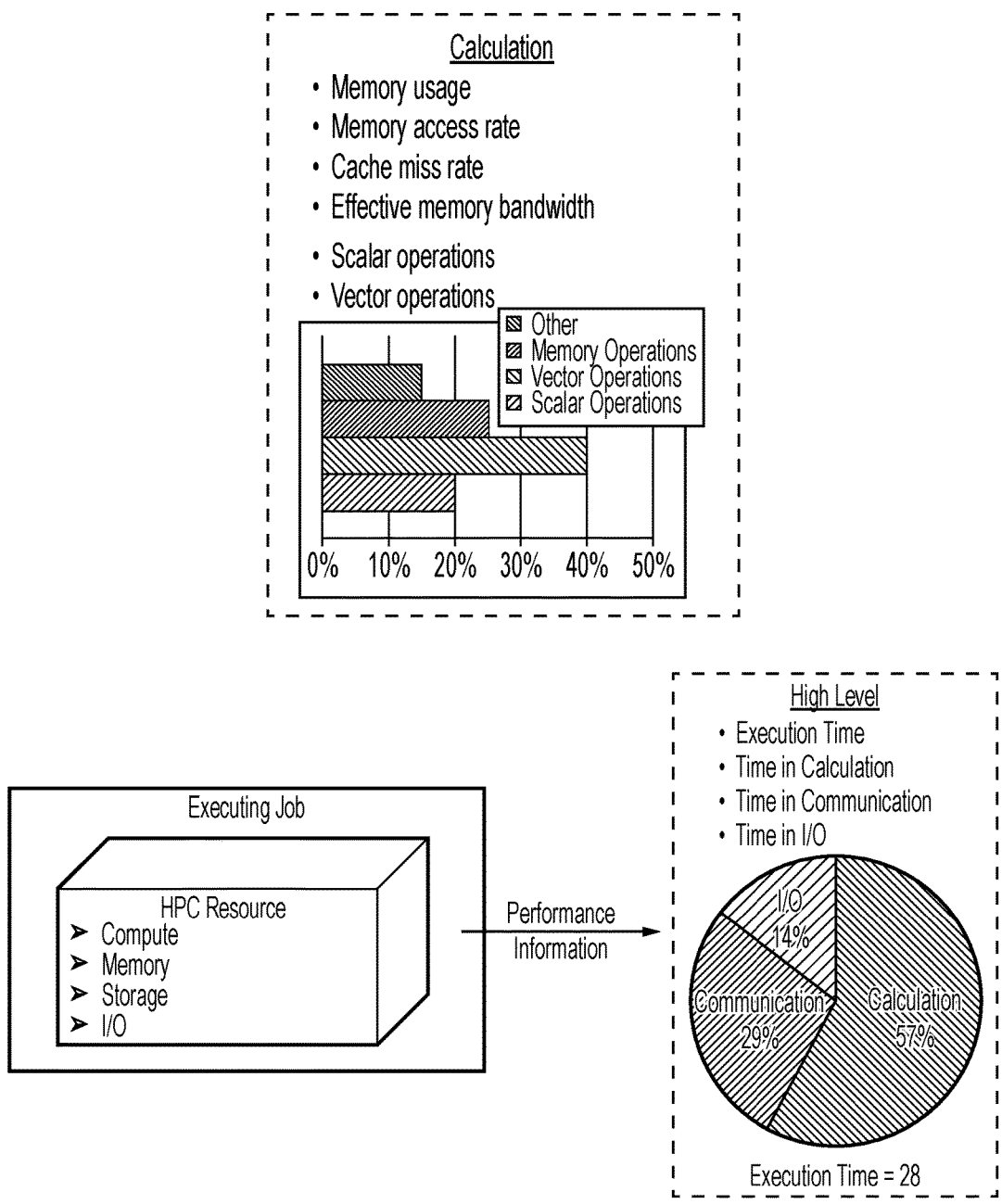
FIG. 10 is a visual representation of exemplary performance statistics.
Figure 10:
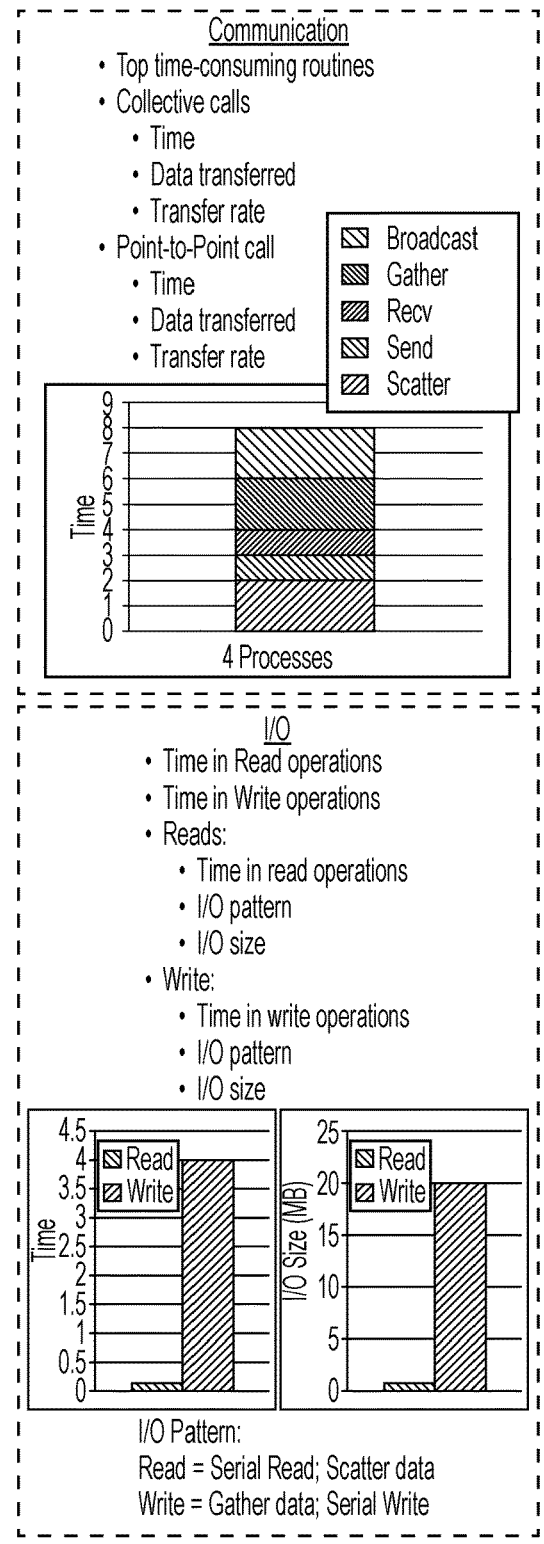

Examples of performance information that is monitored are shown in FIG. 10. This includes application performance details at both a high level such as the time spent in calculation, communication and I/O operations and may also include more in-depth information such as:

CPU, cache and memory utilization rates;
top time consuming communication routines and the message size and transfer rates achieved for these communications; and
I/O statistics such as the file read & file write access pattern (i.e. I/O size, participating processes and I/O cost).
System log information at the time of execution—such as CPU speed; memory availability and speed; network error counters and connectivity; and disk space and health—may also stored in the performance statistics memory 16.

The performance monitor 14 is configured to use the monitored performance information to generate performance statistics for storage in the performance statistics memory. In some cases, performance statistics can merely be extracted from the performance information and stored directly in the performance statistics memory 16. In other cases, the performance monitor 14 may execute stored processing instructions to convert elements from the performance information into performance statistics for storage. As examples, at S106, resource usage statistics are stored. At step S107, performance analysis data is stored. Both are exemplary of performance statistics.

Optionally, the performance information and the processing instructions for generating performance statistics may come from existing performance analysis profiling and tracing tools. The performance monitor 14 is capable of integrating performance information from multiple performance analysis tools, and coordinating the transfer of performance information from those tools to the performance statistics memory 16 as performance statistics.

As the job is identified in the performance statistics memory 16 by a characterization of the simulation job, at step S108, the performance monitor 14 finds executions for the same simulation problem (i.e. having the same characterization of simulation job) and links or aggregates the performance statistics stored for the two (or more) simulation jobs in the performance statistics memory.

If a new execution to be added to the memory has the same characterization and same user-defined resource settings as a historical executed job in the application performance data store, then the new performance statistics are aggregated with the pre-existing performance statistics, so that the aggregated performance statistics become a more accurate predictor of how an execution of the same simulation job with the same user-defined resource settings might be performed.

Figure 11:
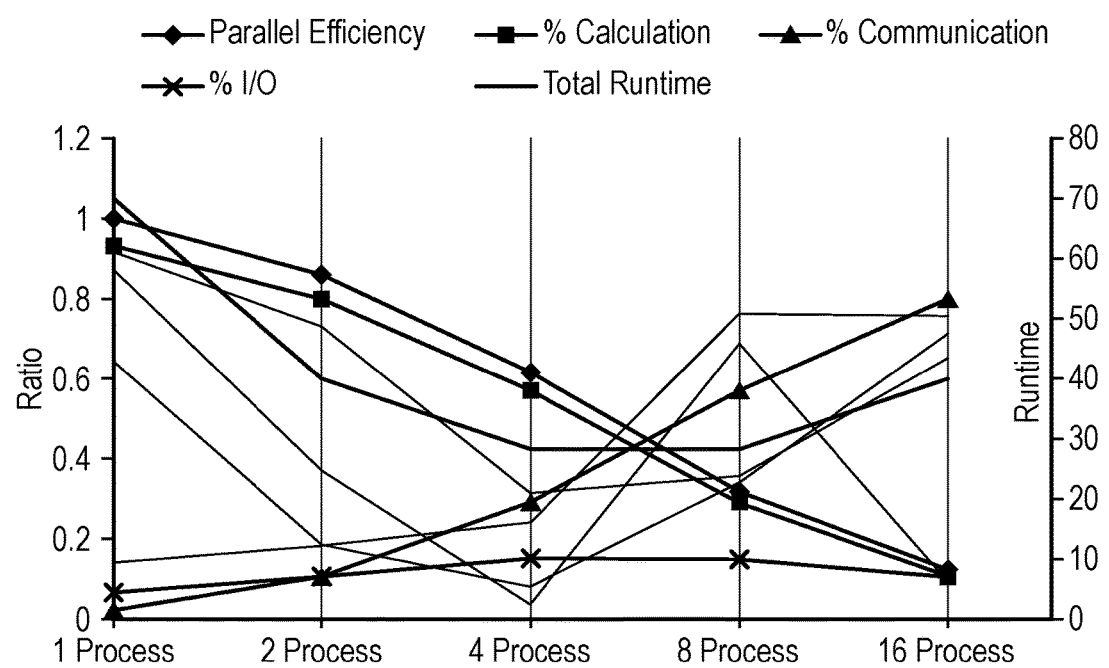
FIG. 11 illustrates performance statistics for different executions of simulation jobs having the same characterization.

If a new execution has the same job characterization as a historical executed job but different user-defined resource settings—for example the job utilizes a different number of processes or performs I/O to a different file system—then the new performance statistics and job information is linked to the performance statistics and job information for the historical executed job, but because they were generated with different settings, the performance statistics are not aggregated. By creating these links, it is possible to build a picture of how application performance is affected by changing job submission settings. This assists the alert generator in finding improved performance statistics. This is shown in FIG. 11 where performance information for the same simulation problem executed on a range of different process counts is combined.

Steps S109 to S117 are exemplary of the functionality of the alert generator 18.

After the job information and performance statistics of the specified simulation job has been stored (noting that the method may be performed during or after execution of the specified simulation job so not all performance statistics may yet have been stored), at steps S109 & S110 the performance statistics memory 16 is queried by the alert generator 18 to find historical executed simulation jobs (which could be from the same or different system users) which have similar user-defined resource settings and/or job characteristics as the user job. The alert generator 18 uses queries to filter the contents of the performance statistics memory 16 to find only the entries with a correlation to the current specified simulation job. The entries found may be weighted based on the level of similarity to the current specified simulation job, with the closest entry given the highest weight.

Figure 12:
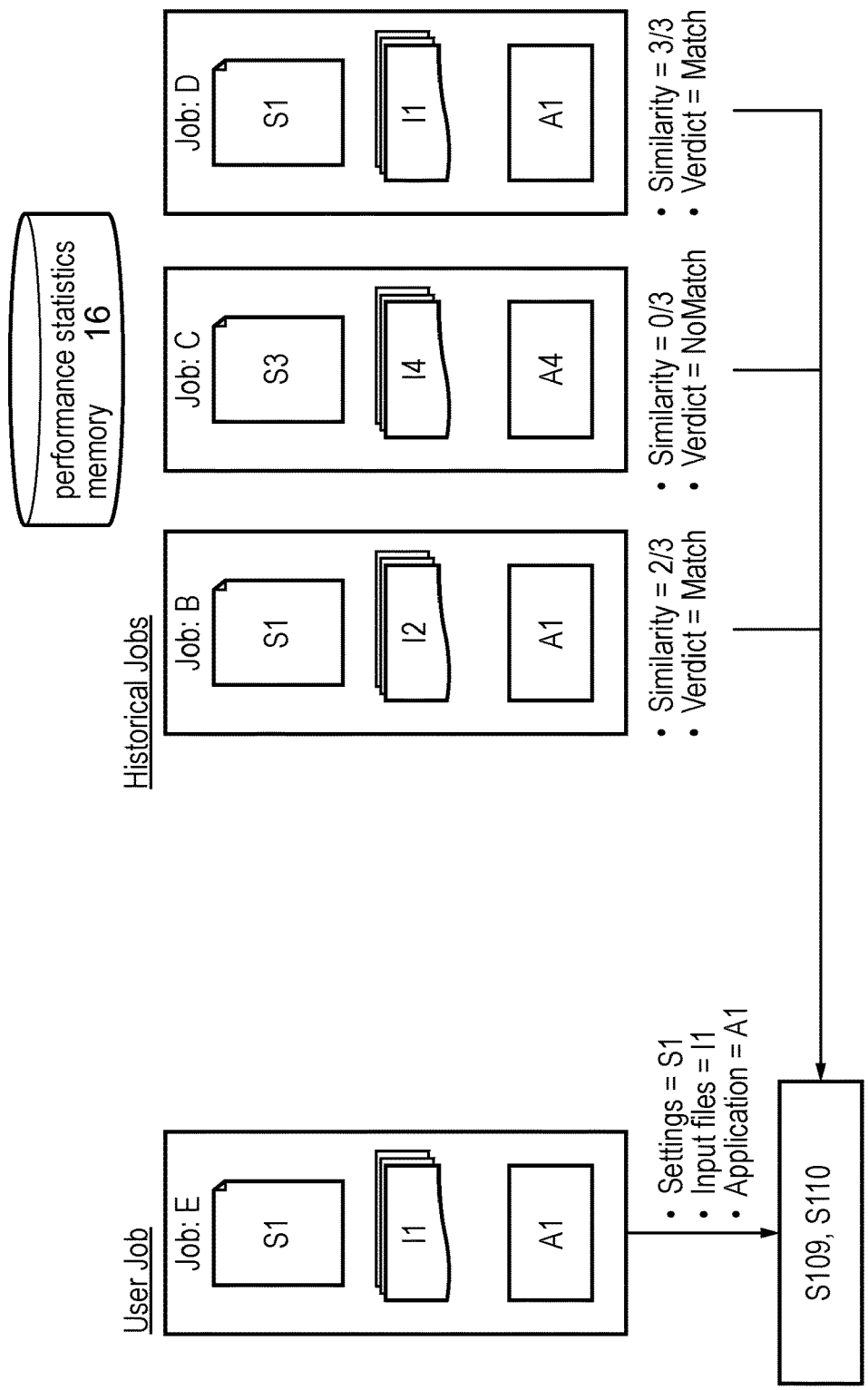
FIG. 12 represents multiple executed simulation jobs for which performance statistics are stored in the performance statistics memory.

FIG. 12 shows an example of the process of determining one or more executed simulation jobs that are similar to the specified simulation job in the memory 16. The user-defined resource settings and job characterization of the specified simulation job are fed as inputs to the procedure. The memory 16 is then queried to find historical executed simulation jobs with similar user-defined resource settings or job characterization, with a summary of which matching jobs and the similarity rating returned as output.

At step S111 these similar jobs are analyzed by the alert generator 18 querying the performance statistics memory 16 to identify the performance statistics of the executed jobs determined similar, and any linked performance statistics— i.e. entries for the same job characterization executed with different user-defined resource settings. For linked entries which result in an improvement in performance, the job submission setting for that entry is added to a matrix of possible candidate settings for alerting the user as to a way of improving the performance of his/her job.

Figure 13:
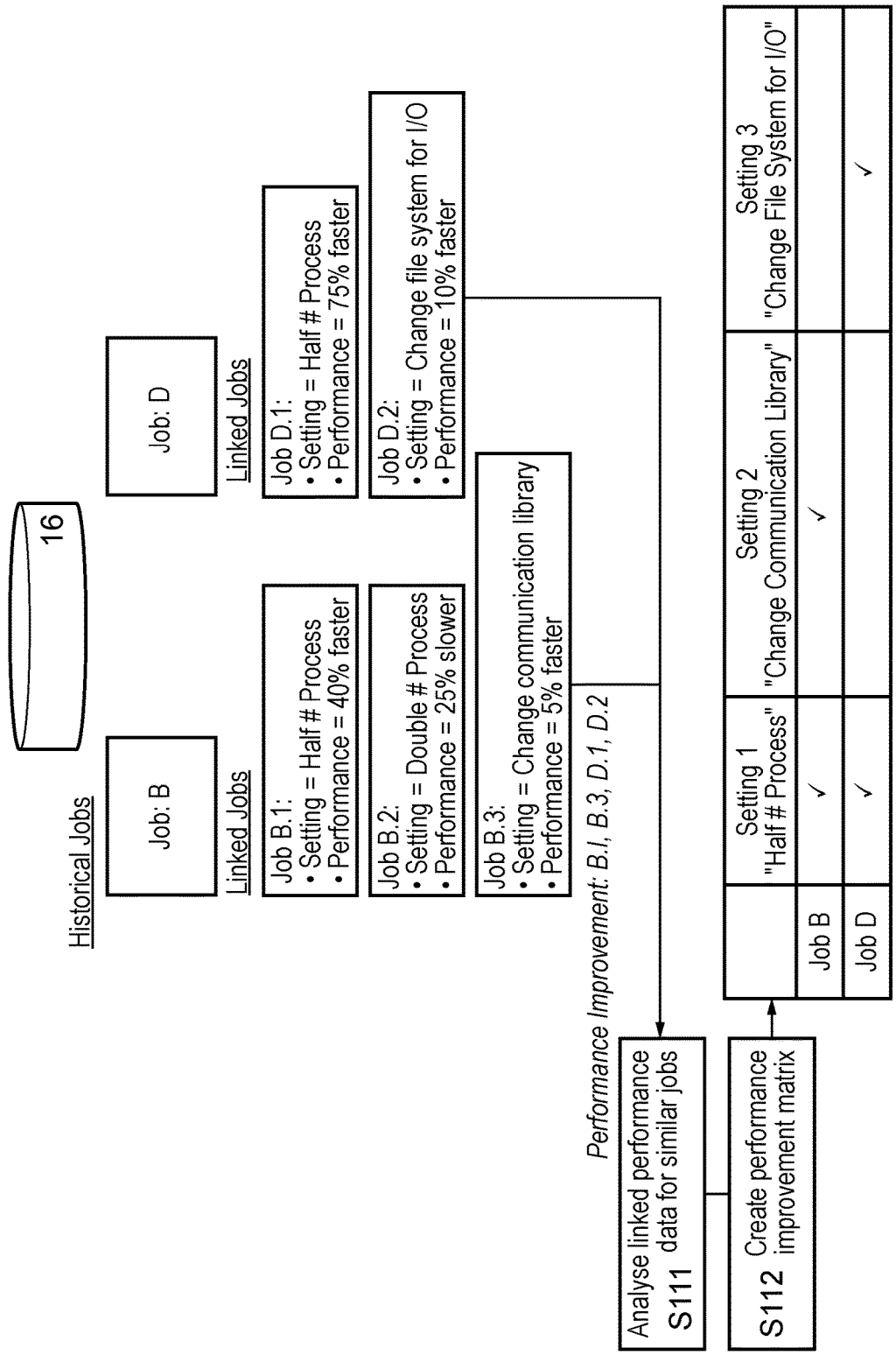
FIG. 13 illustrates a flow of information in compiling a performance improvement matrix.

FIG. 13 shows the procedure of identifying linked jobs and populating the performance improvement matrix.

It can be seen from FIG. 12 that jobs B & D are identified as having some similarity to the specified simulation job. It can be seen in FIG. 13 that the jobs B1 to B3 are linked to job B, the link denoting that the simulation job was characterized in the same way. The alert generator 18 then analyses the performance statistics and user defined resource settings for job B compared with jobs B1 to B3, and identifies differences. A mapping may be stored so that when a performance statistic that has improved is identified, one or more user-defined resource settings that may have influenced the performance statistics are mapped to that performance statistic, the alert generator can then compare the mapped user-defined resource settings to find differences. The same procedure is carried out for job D and linked jobs D1 and D2. At step S112, improved performance statistics and differences in user-defined resource settings mapped to those performance statistics are added to the performance improvement matrix as candidate alerts.

Figure 14:
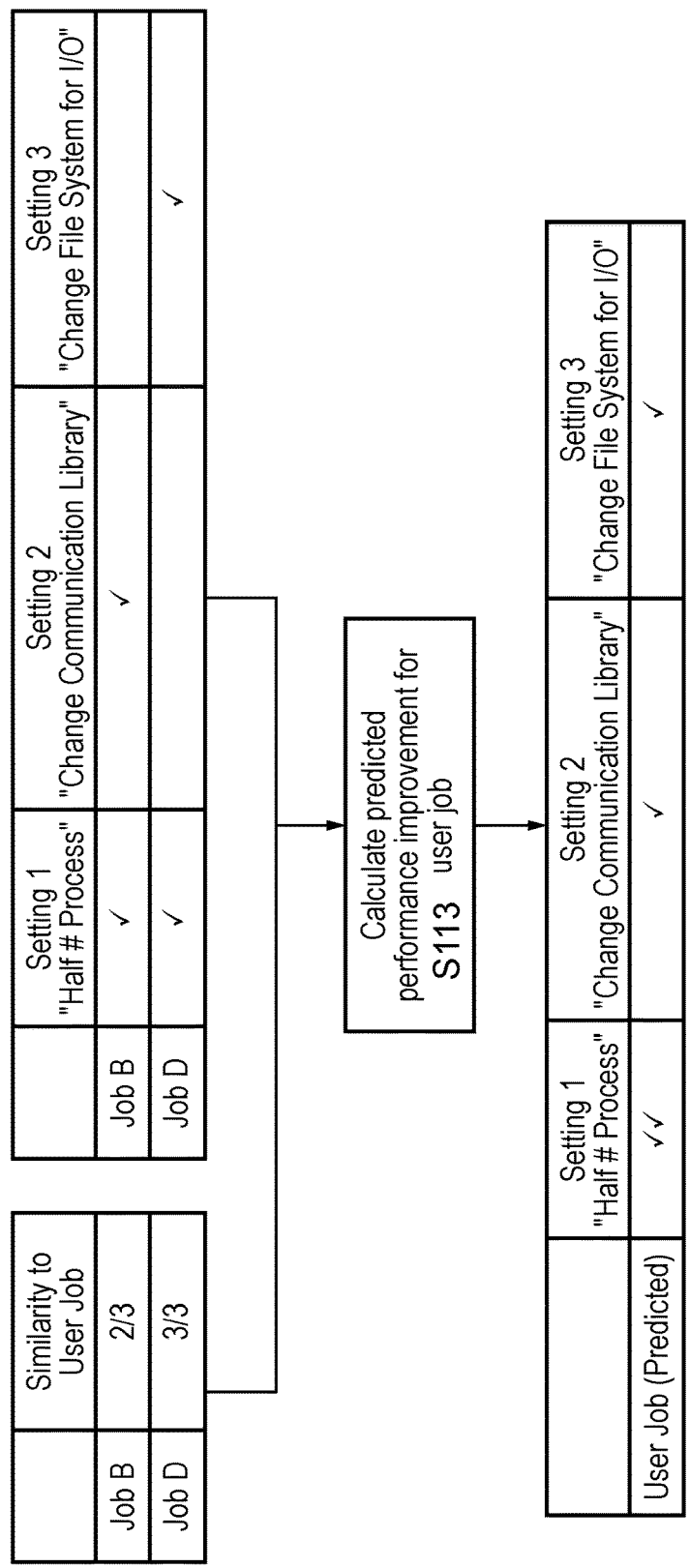
FIG. 14 illustrates the inputs and outputs to a step of determining performance improvement quantity.

At step S113, the alert generator performs processing to quantify an improvement in performance that the change in user-defined resource settings represented by each candidate alert might have on the specified simulation job. The inputs and outputs of this determination are illustrated in FIG. 14, as follows:

Inputs:

Quantified similarity between the specified simulation job and each historical job found in the data store; and A performance improvement factor for each candidate alert in the performance improvement matrix. This factor is the performance improvement of the pertinent performance variable of the linked job in which the user-defined resource setting was used relative to the same performance variable in the performance of the job (determined similar to the specified simulation job) to which the linked job was linked.

Output:

A predicted performance improvement given by each setting when applied to the user job.

In a simple example, it may be that the performance improvement factor is multiplied by a weighting, the weighting being proportional to the quantification of the similarity between the specified simulation job and the similar job linked to the job from which the candidate alert was derived.

In another example, the system may implement a calculation which uses these inputs and produces a vector of the predicted performance of applying each setting to the user job. Different algorithms may be chosen to generate the vector, based on trade-offs between the amount of data present, the computational resource available to perform such calculations, and the level of detail required or any time constraints in returning a result to the user. A sample equation to perform this calculation is shown in Equation (1)

$$P(A, s) = 1 + \frac{\Sigma_j P(j, s) - r(A, j)}{n} \quad (1)$$

In this equation, P(A,s) is predicted performance of job A with setting, s. This is calculated by summing the performance of the each historical job with setting s in the performance improvement matrix, P(j,s), minus its similarity to job A, r(A,j). Taking the average of this summation by dividing by the number of historical jobs that used that setting gives the required performance.

It may be that some ranking of candidate alerts is performed in order to select one or more alerts to present to the system user.

Step S114 is an optional scaling step. The scaling may use the performance statistics obtained by monitoring the execution of the specified simulation job to determine the impact each of the candidate alerts may have on the standard of performance (wherein the standard may be equated directly to time or may also incorporate other performance considerations). For example, a candidate alert may predict that changing the file system will improve performance of I/O operations by 50%. However, if I/O operations account for only 10% of the time of the simulation job then the scaled performance improvement is 5% because changing the file system will only have an impact on the I/O operations. This is an optional step as the predicted performance improvement calculation may already take the performance of the user application into account.

At step S115 the candidate alerts are then ranked in order of the performance improvement quantity (either as scaled in step S114 and/or as calculated in step S113)—the candidate alerts with the highest performance improvement quantity are selected at step S115 for presentation to the user. For example, it may be the n highest, or there may be a threshold performance improvement quantity that must be satisfied for a candidate alert to be presented to the system user.

At S116 the alerts are prepared for presentation to the user. The alerts may be presented in the form of a recommendation informing the user of the performance improvement quantity associated with the difference in user-defined resource settings represented by the selected alert, and highlighting the required modification in user-defined resource settings (i.e. the user-defined resource setting of the linked job giving rise to the improved performance statistics).

At step S117 the selected candidate alerts are then presented to the user in textual or graphical form. Each candidate alert presented contains the predicted performance improvement quantity from applying the recommendation and details about the changes needed to implement the recommendation. Optionally, the job scheduler 12 sets the user-defined resource settings identified in the presented alerts as defaults for the next simulation job requested by the system user. Such setting of defaults may be toggled on and off by the system user.

A worked example will now be presented.

Figure 15:
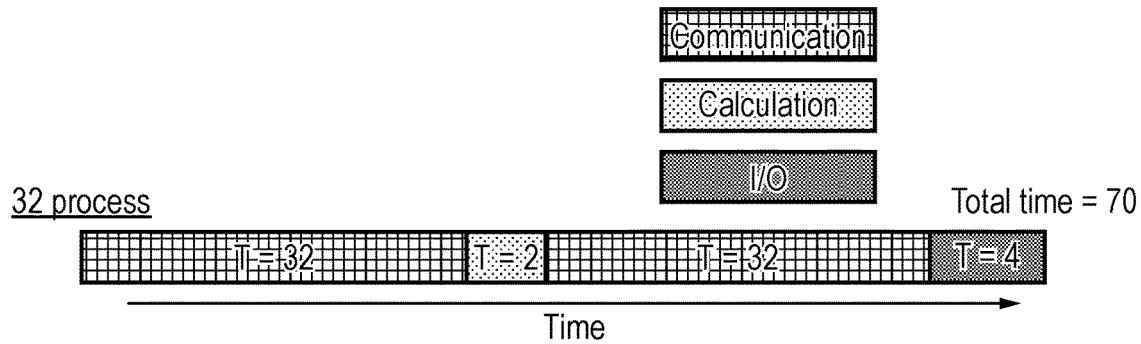
FIG. 15 illustrates high level performance statistics of a worked example implementing an embodiment.

A system user runs a simulation problem using 32 processes to the default file system. The execution time for this job is 70 time units as shown in FIG. 15.

Figure 16:
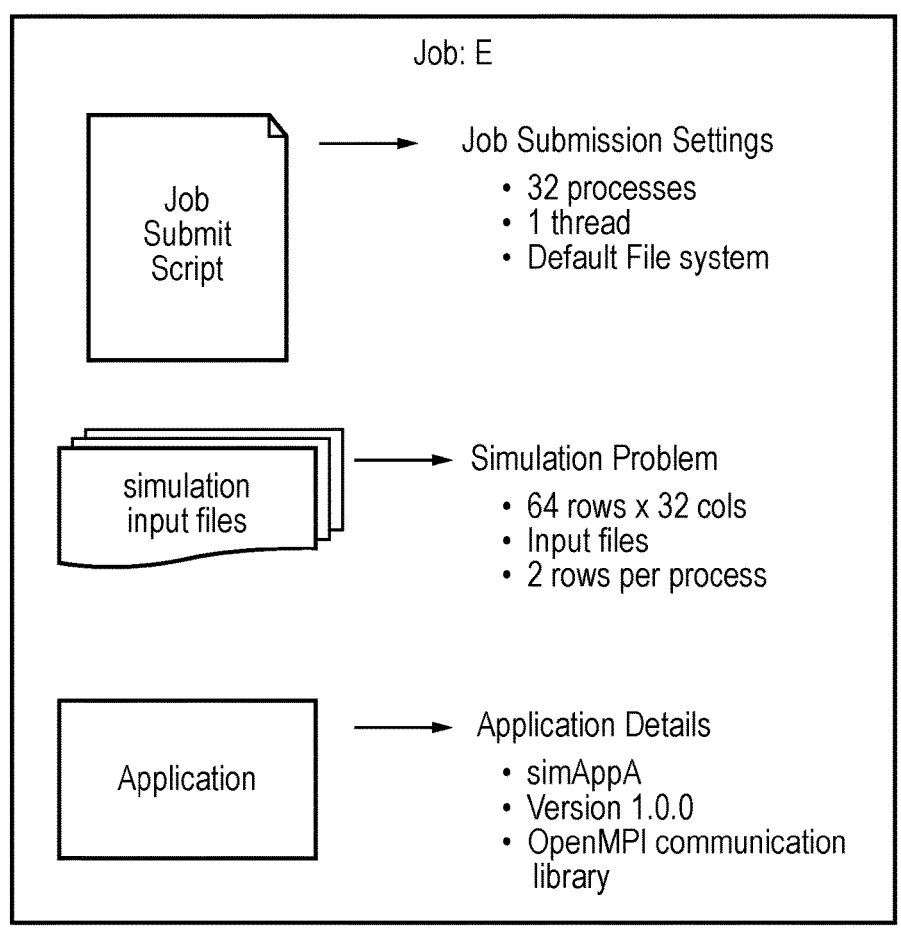
FIG. 16 illustrates stored job information in the worked example.

The job scheduler 12 parses and analyses the input files and job submit script and stores this information in the performance statistics memory 16. The data stored by this stage is shown in FIG. 16. In this worked example, the job submission settings are exemplary of user-defined resource settings, and the simulation problem and application details are exemplary of the job characterization. The job characterization and user-defined resource settings may be collectively referred to as job information.

Figure 17:
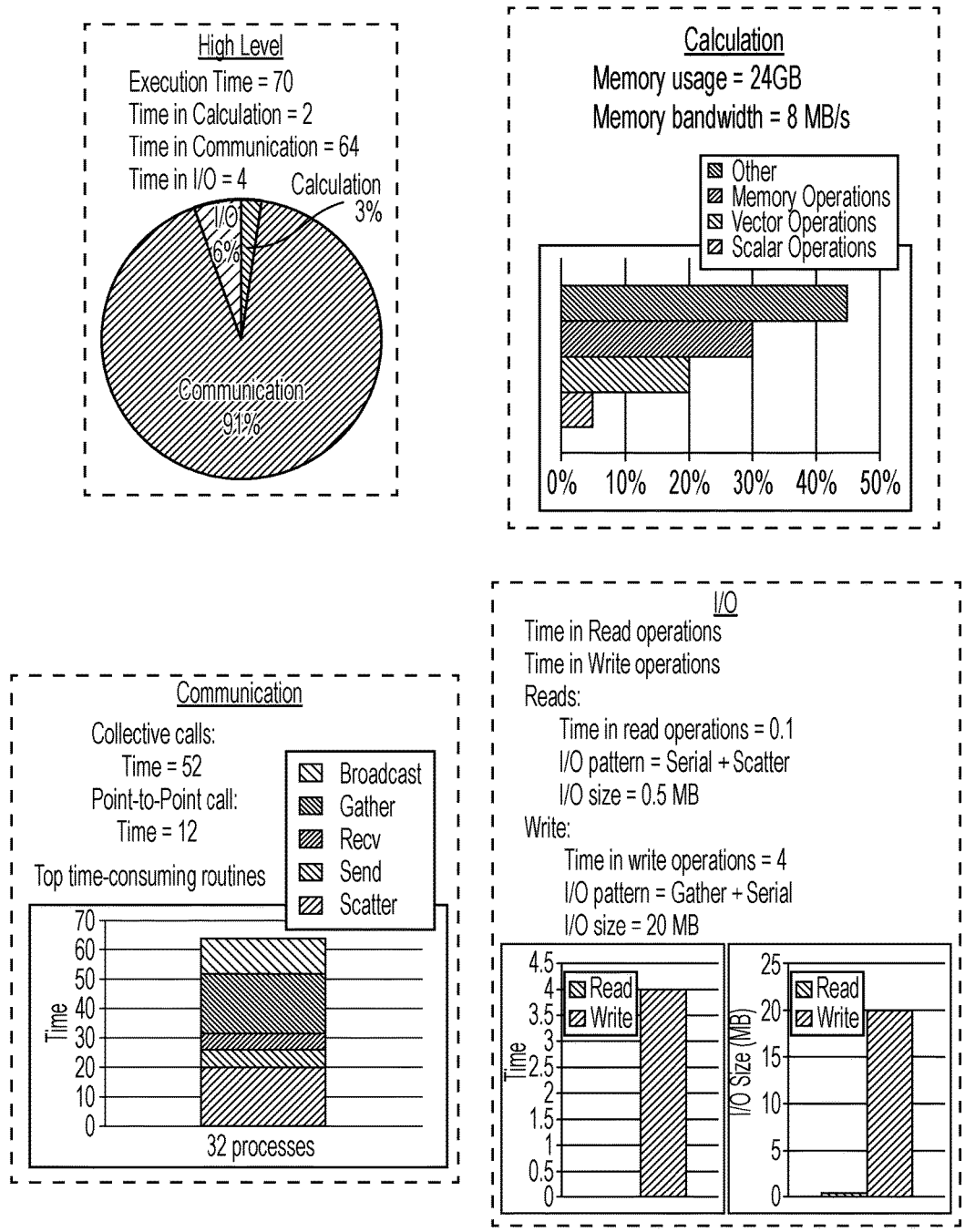
FIG. 17 illustrates stored performance statistics in the worked example.

The performance monitor 14 monitors the execution of the job and generates performance statistics. The generated performance statistics are stored in the performance statistics memory 16 and are associated with the job information already captured by the job scheduler 12. FIG. 17 shows a representation of stored performance statistics. This includes the high level breakdown of execution time and more detailed performance information about the calculation, communication and I/O operations. From the high-level information it is clear that communication dominates execution accounting for 91% of execution time.

Figures 18, 19:
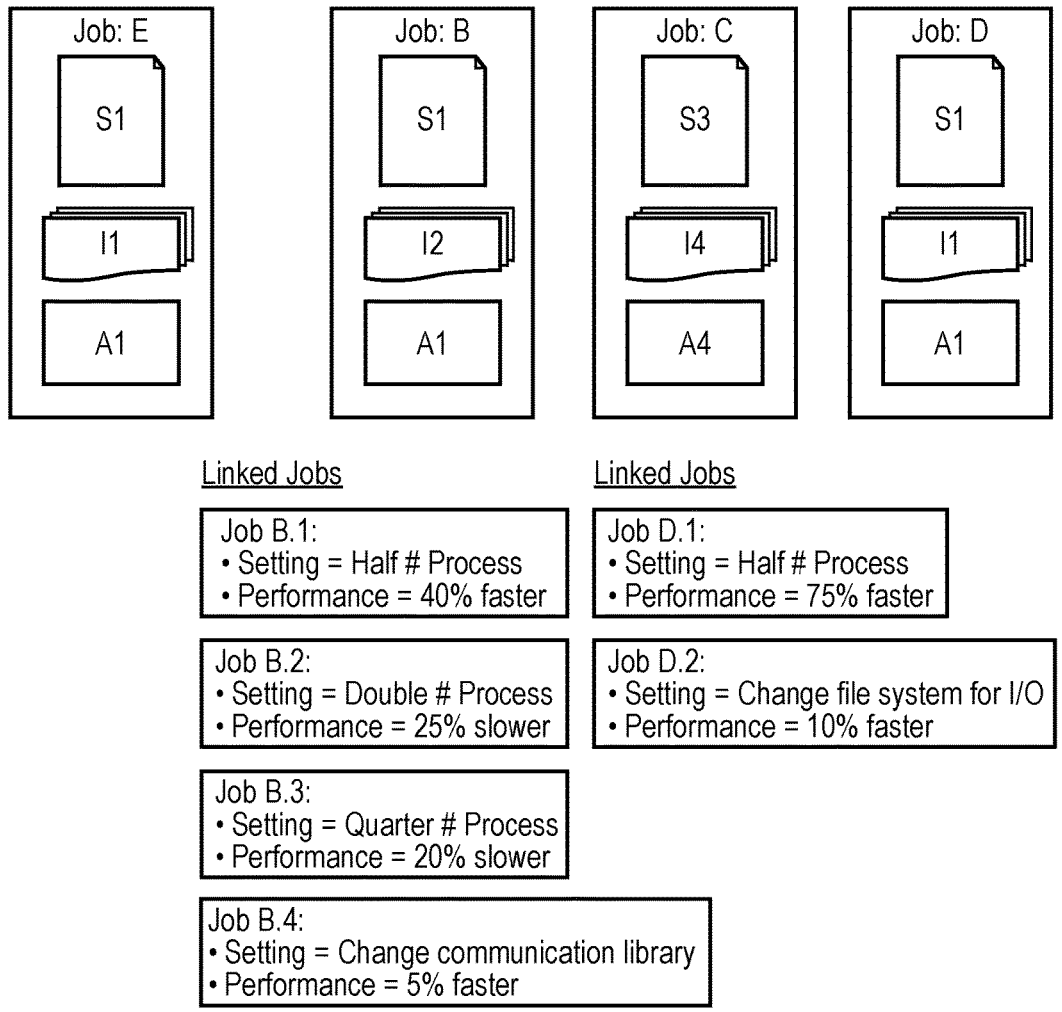
FIG. 18 illustrates stored job information of executed simulation jobs in the worked example.
FIG. 19 illustrates a job similarity vector in the worked example.

The performance statistics memory 16 is already populated with other jobs as shown in FIG. 18. Job B in the memory is for the same application A1 as the specified job (of FIG. 16) but with slightly different input file settings 12. The jobs linked to Job B show that this is a performance study set of jobs providing performance information for a range of process counts and for different communication libraries. The linked jobs have the same job characterization as job B. Job C uses a different application A4 than Job B and solves a different simulation problem 14. This job does not have any linked jobs. Finally, Job D in the data store is for the same submission settings S1 and application details A1 as Job B, but with different simulation input files I1. This job has linked jobs where half the number of processes are tested and where a different file system is used for I/O operations.

For each linked job, a value of a performance variable that is different from the job to which it is linked, and a change in a user-defined resource setting mapped to that performance variable is stored.

The performance similarity searching engine 181 of the alert generator 18 finds the similarity of each historical job in the performance statistics memory to the specified job. From this a similarity vector is returned as shown in FIG. 19. For all historical executed simulation jobs with a similarity weighting greater than 0, a search through each of its linked jobs takes place. Any linked job which results in a performance improvement over the job determined similar to the specified job is added as an entry in the performance improvement matrix.

Figure 20:
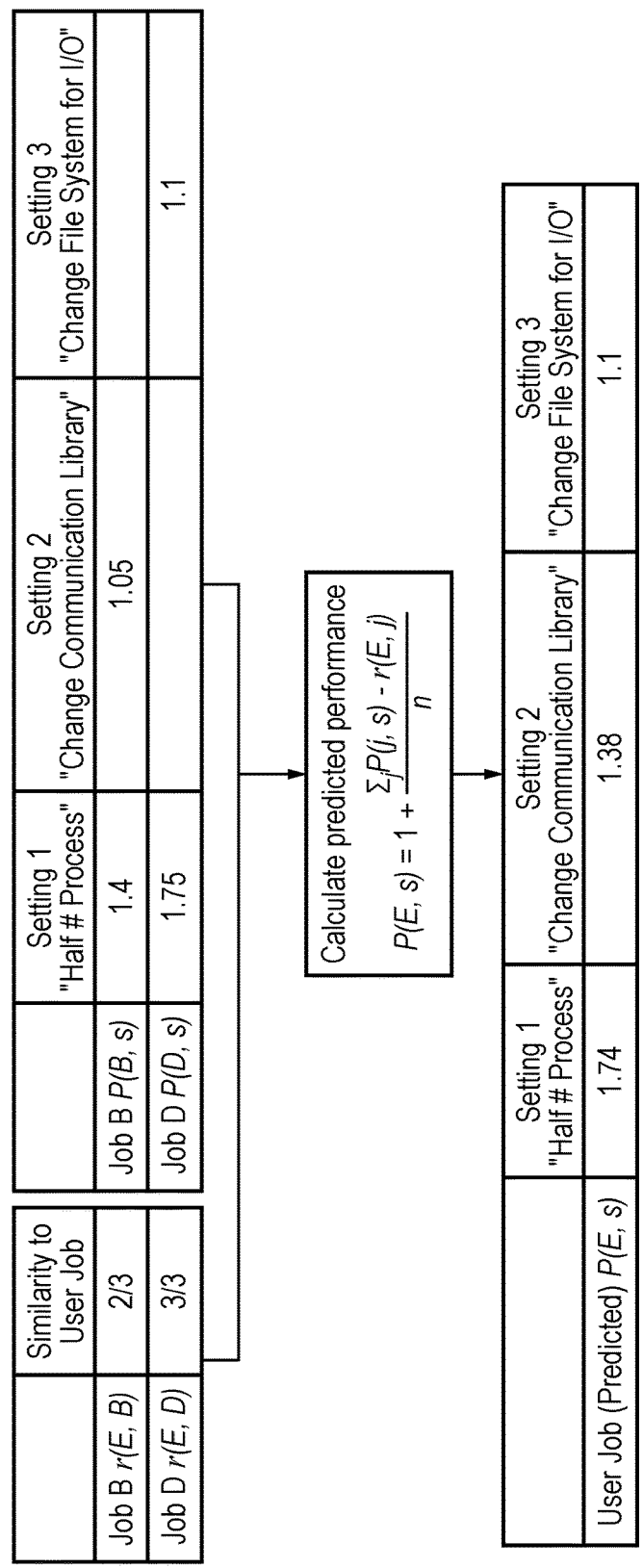
FIG. 20 illustrates determining performance improvement quantities in the worked example.

The similarity weighting and performance improvement matrix are used to calculate the performance improvement quantity for each setting change resulting in an improved value of a performance variable. FIG. 20 shows the result of the calculation using sample Equation (1). It can be seen that, where the same setting change is implemented in two linked jobs (linked to different determined similar jobs), the alert generator uses equation (1) to consolidate the two separate values representing improvement in performance into a single performance improvement quantity. This predicts that performance of the user job will improve by 74% if the number of processes used is halved; by 38% if the communication library is changed; and by 10% a different file system is used.

Figure 23:
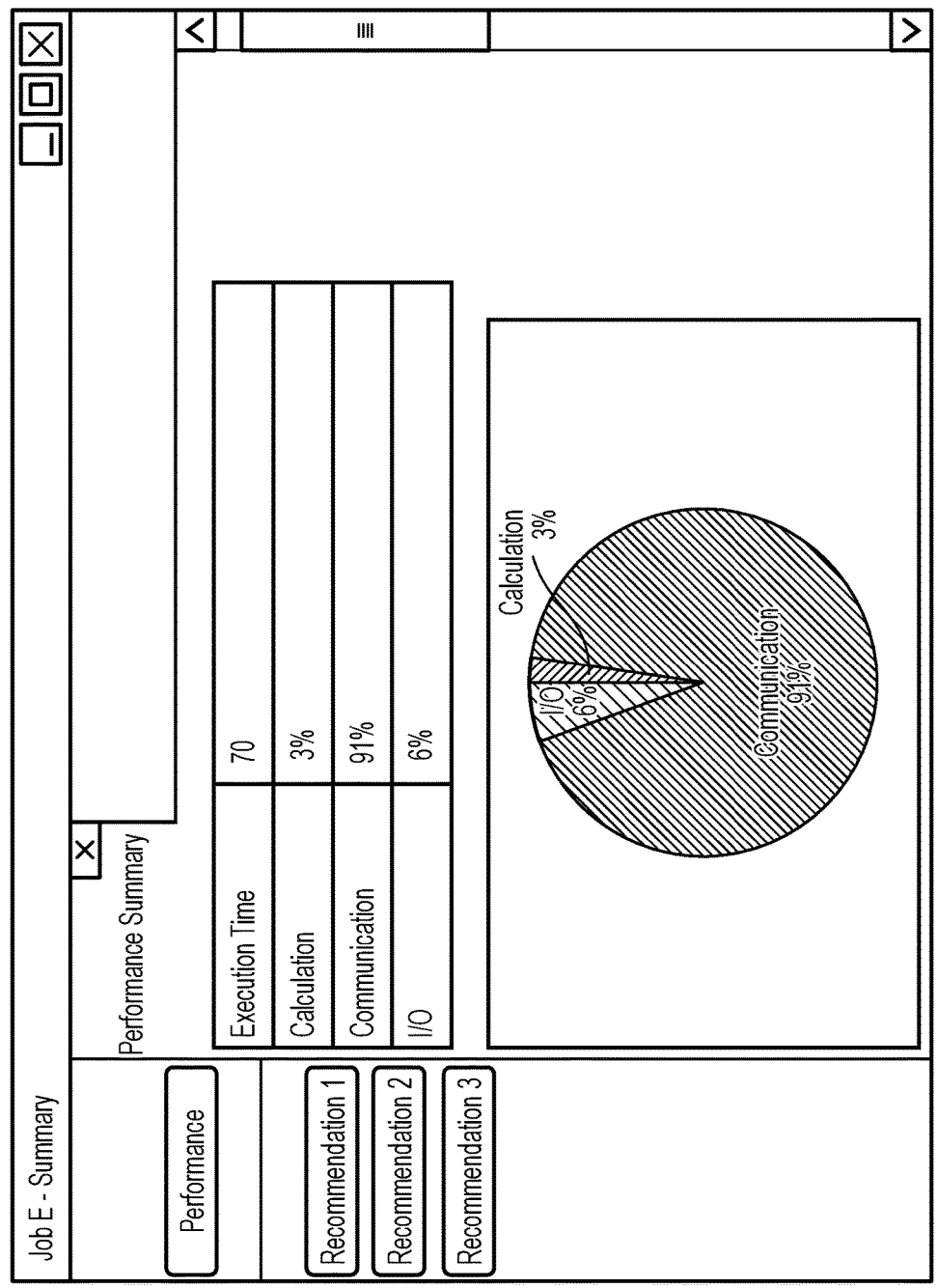
FIG. 23 illustrates a graphical output in the worked example.
Figure 24:
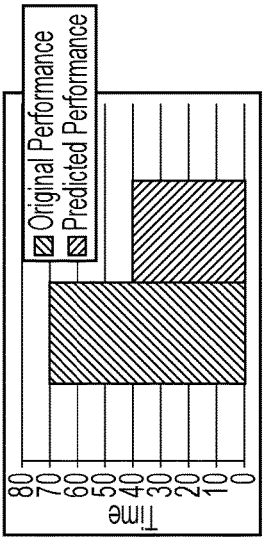
FIG. 24 illustrates alerts in a graphical user interface in the worked example.

Finally, the Recommendation Ordering & User Feedback Engine 182 of the alert generator 18 sorts the output of the predicted performance calculation in order of performance improvement quantity, as shown in FIG. 21. These recommendations are fed back to the user as alerts via a text output—shown in FIG. 22—or a graphical output—shown in FIGS. 23 & 24.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A system for executing simulation jobs, the system comprising:
   a job scheduler to receive a job request submitted by a system user, the job request specifying a simulation job and user-defined resource settings for the simulation job;
   computing hardware resources to execute simulation jobs as instructed by the job scheduler;
   the job scheduler to instruct the computing hardware resources to execute a specified simulation job in accordance with the user-defined resource settings;
   a performance monitor to monitor execution of the specified simulation job by the computing hardware resources and to generate performance statistics representing monitored execution;
   a performance statistics memory to store, for each of a plurality of executed simulation jobs, a characterization of an executed simulation job, the user-defined resource settings for the executed simulation job, and the performance statistics representing execution of the executed simulation job;
   an alert generator, the alert generator to:
   determine one or more executed simulation jobs that are similar to the specified simulation job,
   identify, from among determined one or more executed simulation jobs, a first executed simulation job for which a stored characterization is a same as the stored characterization of a second executed simulation job, and for which one or more of the user-defined resource settings differ between the first executed simulation job and the second executed simulation job,
   determine a performance statistic that is improved in one of the first and second executed simulation jobs relative to an other one of the first and second executed simulation jobs, and
   generate an alert to the system user indicating the one or more user-defined resource settings of the one of the first or second executed simulation jobs identified as having improved performance statistics.

2. The system according to claim 1, wherein:
   the user-defined resource settings comprise a first value for each of a plurality of individual settings;
   the specified simulation job and each of the executed simulation jobs comprises a simulating application running a simulation model in accordance with simulating application inputs;
   the stored characterization of the executed simulation job includes a second value for each of a plurality of job characterization parameters representing the simulating application, the simulation model, and the simulating application inputs; and
   the alert generator to:
   obtain the characterization of the specified simulation job by obtaining the value for each of the plurality of job characterization parameters for the specified simulation job, and
   determine whether the executed simulation job is similar to the specified simulation job based on a comparison of respective values of each of the plurality of job characterization parameters, and based on the comparison of the values of each of the respective individual settings.

3. The system according to claim 2, wherein the alert generator is to:
   determine one or more executed simulation jobs that are similar to the specified simulation job by comparing the value of each of the job characterization parameters and user-defined resource settings for the specified simulation job with one of the value of the same job characterization parameter and user-defined resource setting of each of the executed jobs, and
   when one of a predefined number and a proportion of values for the executed simulation job match one of the value for the specified simulation job for the same job characterization parameter and the user-defined resource setting to within a predefined margin, determine that the executed simulation job is similar to the specified simulation job.

4. The system according to claim 1, wherein
   the user-defined resource settings include a number of parallel processes with which to run the simulation job, and a different number of parallel processes is included in the user-defined resource settings of the first and second executed simulation jobs;

the performance statistics representing the execution of the first and second executed simulation job each include a time taken to execute one of an entire simulation job and a specified portion of the simulation job;

the alert generator to:

determine a performance statistic that is improved in one of the first and second executed simulation jobs relative to another one of the first and second executed simulation jobs based on a comparison of respective times taken to execute; and indicate the number of parallel processes of the executed simulation job from among the first and second executed simulation job having a lesser time taken to execute in the alert.

5. The system according to claim 4, wherein the user-defined resource settings further include a number of threads per parallel process, and a different number of threads per parallel process is included in the user-defined resource settings of the first and second executed simulation jobs; and the alert generator is to indicate in the alert the number of parallel processes and the number of threads per process of the execution simulation job from among the first and second executed simulation job having the lesser time taken to execute.

6. The system according to claim 1, wherein the user-defined resource settings include a selection of a file system for I/O (Input/Output) operations arising in the simulation job, and a different file system for I/O operations is selected in the user-defined resource settings of the first and second executed simulation jobs;

the performance statistics representing the monitored execution and the performance statistics representing the execution of the executed simulation job each include a time taken to complete I/O operations arising in one of an entire simulation job and a specified portion of the simulation job;

the alert generator to:

identify an executed simulation job from the first and second executed simulation jobs having improved performance statistics compared to the another of the first and second executed simulation jobs based on a comparison of the respective times taken to complete I/O operations; and to indicate in the alert the file system for I/O operations of the executed simulation job from the first and second executed simulation jobs having a lesser time taken to complete I/O operations.

7. The system according to claim 1, wherein each performance statistic is a value of a performance variable indicating a standard of performance of an aspect of the execution of the simulation job;

the alert generator is configured to identify a plurality of candidate alerts by identifying, for each of the executed simulation jobs determined to be similar to the specified simulation job as the first executed simulation job, and to ascertain, as the second executed simulation job for each performance variable, an executed simulation job having a same stored characterization as the first executed simulation job and having a value indicating a best standard of performance among other executed simulation jobs having said same characterization, to map the performance variable to one or more resource settings influencing the performance variable using a predefined mapping, and, when the value of a mapped one or more resource settings differ between an ascertained second executed simulation job and the specified simulation job, to store the performance variable, the mapped one or more resource settings of the ascertained second executed simulation job, and a difference in resource settings as a candidate alert;

the alert generator being further configured to generate the alert to the system user by selecting the alert from stored candidate alerts.

8. The system according to claim 7, wherein the alert generator is to quantify, as a performance improvement quantity, the difference in standard of performance for the performance variable between the first executed simulation job and the ascertained second executed simulation job, and to rank candidate alerts in order of performance improvement quantity, and to generate the alert by notifying the system user of each of a top n ranked candidate alerts.

9. The system according to claim 7, wherein the alert generator is to quantify a level of similarity between the specified simulation job and each of the one or more executed simulation jobs that are determined to be similar to the specified simulation job, based on a number of job characterization parameters and user-defined resource settings for which a value of the respective executed simulation job matches the value for the specified simulation job to within a predefined margin; and the alert generator is to attribute a weighting to candidate alerts based on a quantified level of similarity between the specified simulation job and the executed simulation job for which the resource settings and performance improvement quantity are stored, and to rank the candidate alerts in order of performance improvement quantity weighted by an attributed weighting, and to generate an alert by notifying the system user of each of a top n ranked candidate alerts.

10. The system according to claim 1, wherein the alert generator is to transmit the generated alert to the job scheduler, and the job scheduler is configured to set different user-defined resource setting identified in the alert as a default for a next simulation job submitted by the system user.

11. The system according to claim 1, wherein the performance statistics memory is to store, upon completion of the specified simulation job, for the specified simulation job as an executed simulation job, a characterization of the specified simulation job, the user-defined resource settings for the specified simulation job, and the performance statistics generated by the performance monitor representing the execution of the specified simulation job.

12. The system according to claim 11, wherein when the system determines that the characterization of the specified simulation job is a same as the characterization of an executed simulation job in the performance statistics memory, and the user-defined resource settings are the same for the specified simulation job and the executed simulation job, then the system aggregates performance statistics to generate an average value for each performance variable, and stores the average value as a performance statistic for comparison with other executed simulation jobs by the alert generator.

13. The system according to claim 12, wherein when the system determines that the characterization of the specified simulation job is the same as the characterization of an executed simulation job in the performance statistics memory, and the user-defined resource settings are different for the specified simulation job and the executed simulation job, then the system links performance statistics of the specified simulation job and the executed simulation job.

14. A computer-implemented method for controlling the execution of simulation jobs on computing hardware resources, the method comprising:
   receiving a job request submitted by a system user, the job request specifying a simulation job and user-defined resource settings for the simulation job;
   instructing the computing hardware resources to execute a specified simulation job in accordance with the user-defined resource settings;
   monitoring execution of the specified simulation job by the computing hardware resources and generating performance statistics representing the monitored execution;
   storing, in a performance statistics memory, for each of a plurality of executed simulation jobs, a characterization of an executed simulation job, the user-defined resource settings for the executed simulation job, and the performance statistics representing execution of the executed simulation job;
   determining one or more executed simulation jobs that are similar to a specified simulation job, identifying, from among determined one or more executed simulation jobs, a first executed simulation job for which a stored characterization is a same as the stored characterization of a second executed simulation job, and for which one or more of the user-defined resource settings differ between the first executed simulation job and the second executed simulation job, determining a performance statistic that is improved in one of the first and second executed simulation jobs relative to another one of the first and second executed simulation jobs, generating an alert to the system user indicating the one or more user-defined resource settings of the first or second executed simulation job identified as having improved performance statistics.

15. A computer-readable non-transitory storage medium storing a computer program which, when implemented by a computing device, causes the computing device to execute a method comprising:
   receiving a job request submitted by a system user, the job request specifying a simulation job and user-defined resource settings for the simulation job;
   instructing the computing hardware resources to execute a specified simulation job in accordance with the user-defined resource settings;
   monitoring execution of the specified simulation job by the computing hardware resources and generating performance statistics representing the monitored execution;
   storing, in a performance statistics memory, for each of a plurality of executed simulation jobs, a characterization of the executed simulation job, the user-defined resource settings for the executed simulation job, and the performance statistics representing execution of the executed simulation job;
   determining one or more executed simulation jobs that are similar to a specified simulation job, identifying, from among determined one or more executed simulation jobs, a first executed simulation job for which a stored characterization is a same as the stored characterization of a second executed simulation job, and for which one or more of the user-defined resource settings differ between the first executed simulation job and the second executed simulation job, determining a performance statistic that is improved in one of the first and second executed simulation jobs relative to the other one of the first and second executed simulation jobs, generating an alert to the system user indicating the one or more user-defined resource settings of the first or second executed simulation job identified as having improved performance statistics.

* * * * *